United States Patent

Morikawa

[11] Patent Number: 6,158,411
[45] Date of Patent: *Dec. 12, 2000

[54] CONTROL SYSTEM FOR TWO CYCLE DIRECT INJECTION ENGINE AND THE METHOD THEREOF

[75] Inventor: Koji Morikawa, Tokyo, Japan

[73] Assignee: Fuji Jukogyo Kabushiki Kaisha, Tokyo, Japan

[*] Notice: This patent is subject to a terminal disclaimer.

[21] Appl. No.: 09/420,581

[22] Filed: Oct. 19, 1999

Related U.S. Application Data

[60] Continuation of application No. 09/082,307, May 20, 1998, Pat. No. 5,992,374, which is a division of application No. 08/654,292, May 28, 1996, Pat. No. 5,819,701.

[30] Foreign Application Priority Data

Jun. 22, 1995 [JP] Japan ................................. 7-156356

[51] Int. Cl.[7] .................................................. F02D 43/00
[52] U.S. Cl. .......................... 123/304; 123/481; 123/305
[58] Field of Search ..................................... 123/304, 305, 123/73 C, 21, 1 A, 478, 480, 481, 487, 494

[56] References Cited

U.S. PATENT DOCUMENTS

| | | | |
|---|---|---|---|
| 4,509,488 | 4/1985 | Förster et al. ........................... | 123/481 |
| 4,991,558 | 2/1991 | Daly et al. ............................... | 123/481 |
| 5,036,801 | 8/1991 | Imajou ..................................... | 123/21 |
| 5,174,261 | 12/1992 | Fujii et al. ............................... | 123/435 |
| 5,259,344 | 11/1993 | Huang et al. ............................ | 123/481 |
| 5,333,583 | 8/1994 | Matsuura ................................. | 123/478 |
| 5,819,701 | 10/1998 | Morikawa ................................ | 123/305 |

*Primary Examiner*—Andrew M. Dolinar
*Attorney, Agent, or Firm*—Smith Gambrell & Russell, LLP

[57] ABSTRACT

Disclosed is a control system and method of a two cycle direct fuel injection engine capable of smoothly suspending combustions in the cylinder during light load operation of the engine. Based on a map parameterizing the engine speed and the target engine load, it is judged whether or not, when the engine load is in the light load condition, the target engine load is located in a suspending area in which misfires tend to occur. If the target engine load is not in the suspending area, since there is no possibility of misfire, the normal combustion cycle continues to operate. On the other hand, if the target engine load enters into the suspending area, the control system instructs the fuel injection and ignition apparatuses so as to suspend fuel injection and spark ignition with a frequency determined according to the magnitude of the engine load. The frequency is determined by a predetermined formula such that it is reduced as the engine load becomes high and is increased as the engine load becomes low.

16 Claims, 19 Drawing Sheets

FIG. 5a

EXAMPLE: WHERE N=500 & X=255

| NUMBER OF CYCLE | 1 | 2 | 3 | 4 | 5 | 6 | ... |
|---|---|---|---|---|---|---|---|
| M | 1 | 0 | 1 | 0 | 1 | 0 | ... |
| X/N | $\frac{255}{500}$ | $\frac{255}{500}$ | $\frac{255}{500}$ | $\frac{255}{500}$ | $\frac{255}{500}$ | $\frac{255}{500}$ | ... |
| d(i) | $\frac{245}{500}$ | $-\frac{10}{500}$ | $\frac{235}{500}$ | $-\frac{20}{500}$ | $\frac{225}{500}$ | $-\frac{30}{500}$ | ... |

FIG. 5b

EXAMPLE: WHERE N=500 & X=400

| NUMBER OF CYCLE | 1 | 2 | 3 | 4 | 5 | 6 | ... |
|---|---|---|---|---|---|---|---|
| M | 1 | 0 | 1 | 1 | 1 | 1 | ... |
| X/N | $\frac{400}{500}$ | $\frac{400}{500}$ | $\frac{400}{500}$ | $\frac{400}{500}$ | $\frac{400}{500}$ | $\frac{400}{500}$ | ... |
| d(i) | $\frac{100}{500}$ | $-\frac{300}{500}$ | $-\frac{200}{500}$ | $-\frac{100}{500}$ | 0 | $\frac{100}{500}$ | ... |

FIG. 5c

EXAMPLE: WHERE N=500 & X=100

| NUMBER OF CYCLE | 1 | 2 | 3 | 4 | 5 | 6 | ... |
|---|---|---|---|---|---|---|---|
| M | 1 | 0 | 0 | 0 | 0 | 1 | ... |
| X/N | $\frac{100}{500}$ | $\frac{100}{500}$ | $\frac{100}{500}$ | $\frac{100}{500}$ | $\frac{100}{500}$ | $\frac{100}{500}$ | ... |
| d(i) | $\frac{400}{500}$ | $\frac{300}{500}$ | $\frac{200}{500}$ | $\frac{100}{500}$ | 0 | $\frac{400}{500}$ | ... |

CONTROL SYSTEM FOR TWO CYCLE DIRECT INJECTION ENGINE AND THE METHOD THEREOF

CONTINUING APPLICATION DATA

This application is a continuation of U.S. patent application Ser. No. 09/082,307, filed May 20, 1998, now U.S. Pat. No. 5,992,374, which application is a divisional of U.S. patent application Ser. No. 08/654,292, filed May 28, 1996, now U.S. Pat. No. 5,819,701. These parent applications are entirely incorporated herein by reference.

BACKGROUND OF THE INVENTION

1. Field of the Invention

The present invention relates to a control system and method of a two cycle direct fuel injection engine and more particularly to an engine control system and method capable of eliminating misfires and improving combustion by means of suspending fuel injection and ignition periodically.

2. Prior Art

In conventional port scavenging two cycle engines, generally the amount of residual gas versus the amount of fresh air increases in the light loading condition and consequently misfires tend to occur cyclically in the cylinder. As a result of this, excessive emissions of unburned hydrocarbons contributing to poor fuel economy are produced.

Miscellaneous techniques to solve these problems have been proposed. Among them, the stratified charge combustion techniques in which fuel is directly injected into cylinders and burned in the stratified manner are effective to prevent misfiring. The conditions to realize the stratified charge combustion are not simple, namely conditions such as the shape of the combustion chamber, the state of fuel spray, the state of gas flow, miscellaneous control values and the like are needed to put into good trim. However, it is generally difficult to realize homogeneous combustion in the high speed and high load conditions with these conditions retained. Especially in the case of small engines with a high specific power, these conditions to realize the stratified charge combustion are difficult to be satisfied.

Therefore, in order to prevent misfires under light load conditions, other techniques than the stratified charge combustion must be chosen. Thus, it is considered to reduce combustion cycles, namely to suspend combustions selectively in the light load condition where misfires tend to occur. By selectively suspending combustions, it is possible to assure a good scavenging in a cycle wherein combustion is suspended and to assure a good combustion in a cycle wherein combustion is undertaken.

As techniques of suspending combustions, for example, Japanese Patent Application Toku-Kai-Sho 62-157259 disclosed a technique of selectively suspending fuel injections for a diesel engine and Japanese Patent Application Toku-Kai-Sho 59-65526 also discloses a technique of selectively suspending fuel injections for a port injection type four-cycle engine.

However, in a two cycle direct fuel injection engine, no specific technique of selectively suspending fuel injection has ever been disclosed. Therefore, it is now expected that a two cycle direct fuel injection engine capable of smoothly controlling combustions in light load conditions will be developed.

SUMMARY OF THE INVENTION

It is, therefore in view of the above situations, an object of the present invention to provide a control system for a two cycle in cylinder fuel injection engine capable of reducing hydrocarbon emissions and of improving fuel economy.

It is another object of the invention to provide a combustion control system capable of applying to an actual two-cycle in cylinder fuel injection engine easily, securedly and with low cost.

To achieve these objects, the control system according to the present invention comprises:

target load detecting means for detecting an engine load targeted by an engine operator;

engine speed detecting means for detecting an engine speed;

mapping means for mapping a suspending area wherein fuel injection and spark ignition are to be suspended;

suspending control judging means for judging whether or not the engine load parameterizing the engine speed is located in the suspending area;

suspending frequency determining means when the engine load parameterizing the engine speed is located in the suspending area for determining a frequency of suspending fuel injection and spark ignition so as to reduce the frequency with an increase of the engine load;

injection suspending means for suspending fuel injection according to the frequency; and ignition suspending means for suspending fuel ignition according to the frequency.

BRIEF DESCRIPTION OF THE DRAWINGS

FIG. 5 is an example of a chart for calculating cycles of suspending combustion according to a first embodiment of the present invention;

DETAILED DESCRIPTION OF PREFERRED EMBODIMENTS

Figure 2:
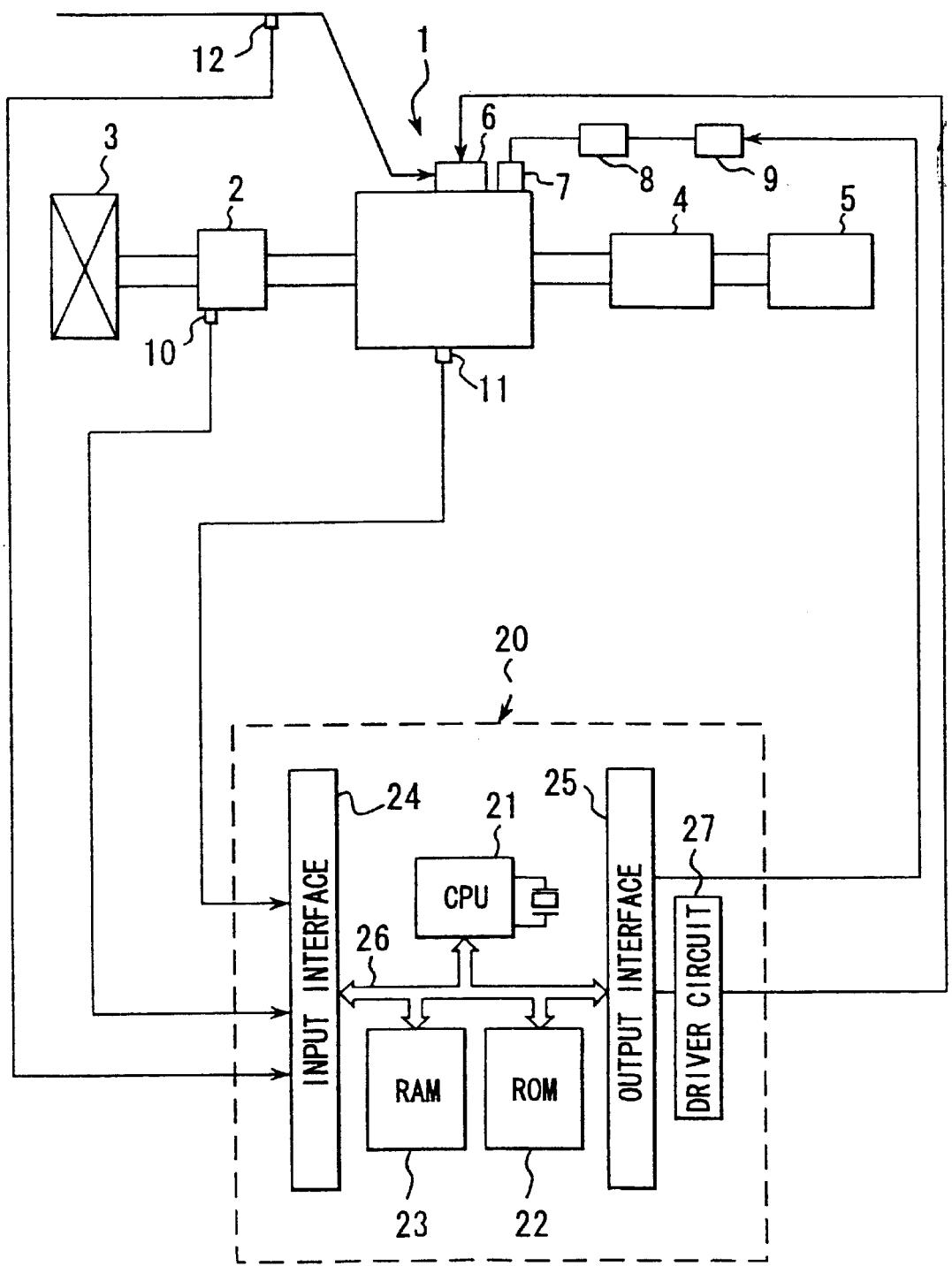
FIG. 2 is a schematic diagram showing an engine control system according to a first embodiment of the present invention.

Referring now to FIG. 2, numeral 1 denotes a two-cycle in-cylinder fuel injection engine in which fuel is directly injected into cylinders and a fuel mixture gas is burned by spark ignition. The intake system of the engine 1 is equipped with a throttle body 2 incorporating a throttle valve therein, and an air cleaner 3 is disposed upstream of the throttle body 2. On the other hand, in the exhaust system of the engine 1 there is provided with a catalytic converter 4 for purifying exhaust gases and downstream of the catalytic converter 4 there is provided with a muffler 5.

In the combustion chamber of the engine 1 there are provided a fuel injector 6 for directly injecting high pressure fuel thereinto and a spark plug 7. The spark plug 7 is connected with the secondary winding side of an ignition coil 8 and an igniter 9 driven by an electronic control unit (ECU) 20 for engine control is connected with the primary side of the ignition coil 8.

The ECU 20 comprises a CPU 21, a ROM 22 for storing a control program, miscellaneous maps and fixed data, a RAM 23 for storing miscellaneous processed data, an input interface 24 to which signals of sensors for detecting engine conditions are inputted, an output interface 25 for outputting control signals of the CPU 21 to miscellaneous actuators and a bus line 26 for connecting these devices with each other.

The input interface 24 is connected with a throttle opening angle sensor 10 incorporated in the throttle body 2 for detecting an opening angle of the throttle valve, a crank angle sensor 11 for detecting a crank angle of the engine 1 and a fuel pressure sensor 12 for detecting a fuel pressure of the high pressure line in the fuel system.

On the other hand, the output interface 25 is connected with the igniter 9 and the fuel injector 6 through a drive circuit 27.

In the CPU 21, miscellaneous control values such as a fuel injection amount, an ignition timing and the like are calculated based upon the miscellaneous data stored in the RAM 23 according to the control program stored in the ROM 22 and these control values are outputted to the injector 6 and the igniter 9 so as to maintain the engine 1 in the optimal condition.

That is to say, when the engine load stays at the low load condition wherein misfires tend to occur, the frequency of suspending combustions is determined in accordance with the magnitude of the engine load and signals for suspending combustions are outputted to the fuel injector 6 and the igniter 9. The frequency of suspending combustions is controlled by calculations which will be described in detail hereinafter in such a way that the suspending of combustions increases as the engine load becomes large and decreases as the engine load becomes small.

Figure 1:
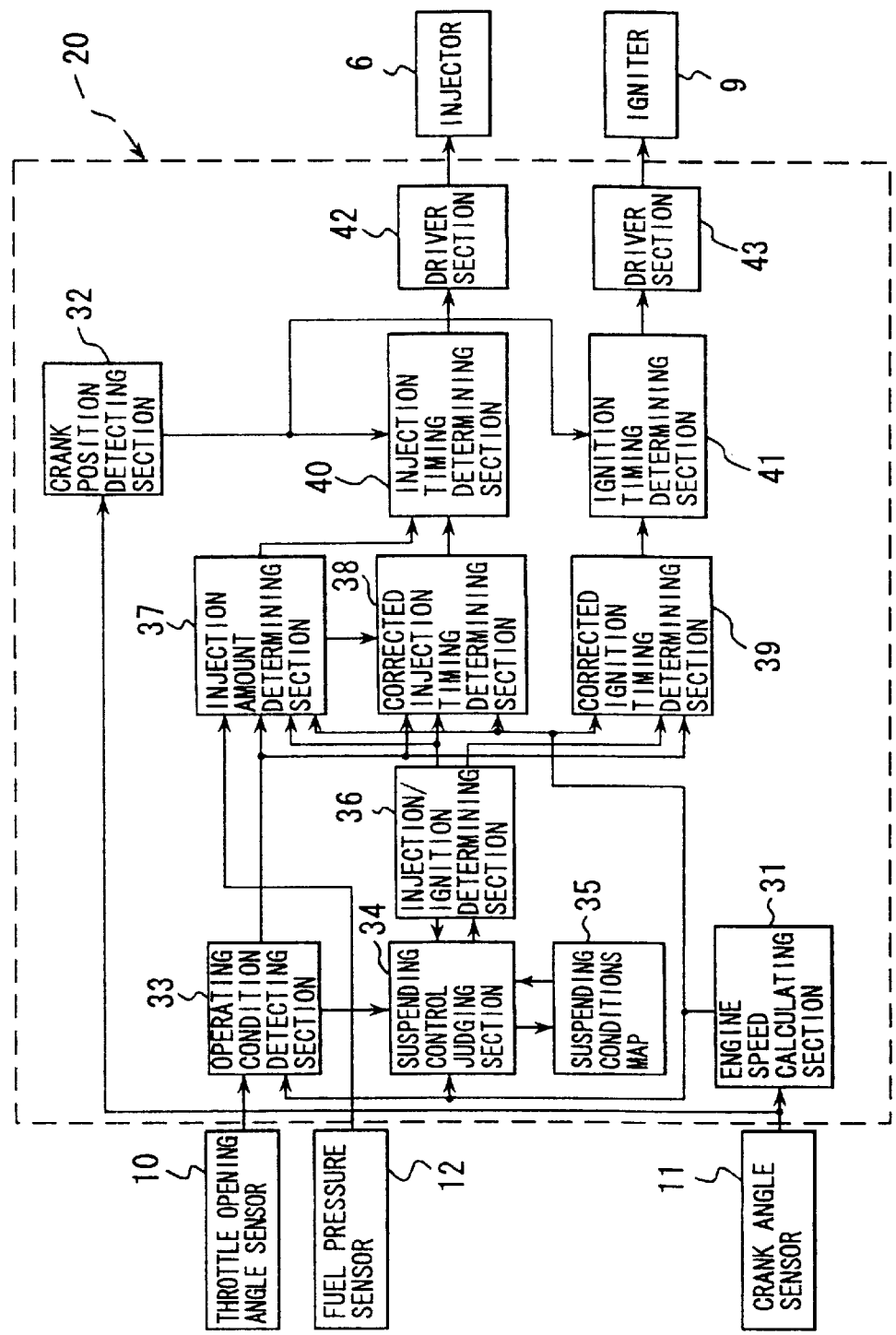
FIG. 1 is a functional block diagram of an electronic control unit according to a first embodiment of the present invention.

In order to realize the above cycle control, as indicated in FIG. 1, the ECU 20 comprises an engine speed calculating section 31, a crank position detecting section 32, an operating conditions detecting section 33, a suspending control judging section 34, a suspending conditions map 35, an injection/ignition determining section 36, an injection amount determining section 37, a corrected injection timing determining section 38, a corrected ignition timing determining section 39, an injection timing determining section 40, an ignition timing determining section 41 and driver sections 42, 43.

The engine speed calculating section 31 calculates an engine speed $N_E$ based on signals derived from the crank angle sensor 11, that is, the crank angle sensor 11 and the engine speed calculating section 31 constitutes engine speed detecting means. Further, the crank position detecting section 32 detects a crank angle based on signals derived from the crank angle sensor 11.

The operating conditions detecting section 33 is for detecting an engine load corresponding to a throttle opening angle α based on signals from the throttle sensor 10. That is, the throttle opening angle sensor 10 and the operating conditions detecting section 33 constitute a target engine load detecting means. Further, in this operating conditions detecting section 33, a reference delivery ratio $L_0$ is determined by referring to a predetermined table parameterizing the throttle opening angle α and the engine speed $N_E$. An optimal reference delivery ratio $L_0$ corresponding to the combination of the throttle opening angle α and the engine speed $N_E$ is prepared beforehand by experiments and is stored on a specific area of that table.

In the suspending control judging section 34, it is judged whether or not a target load required by an engine operator is located in a predetermined suspending area (an area in which the suspending of combustions is to be performed by suspending fuel injection and ignition) by referring to the suspending conditions map 35 parameterizing the engine load detected by the operating condition detecting section 33 and the engine speed $N_E$ calculated in the engine speed calculating section 31.

Figure 4:
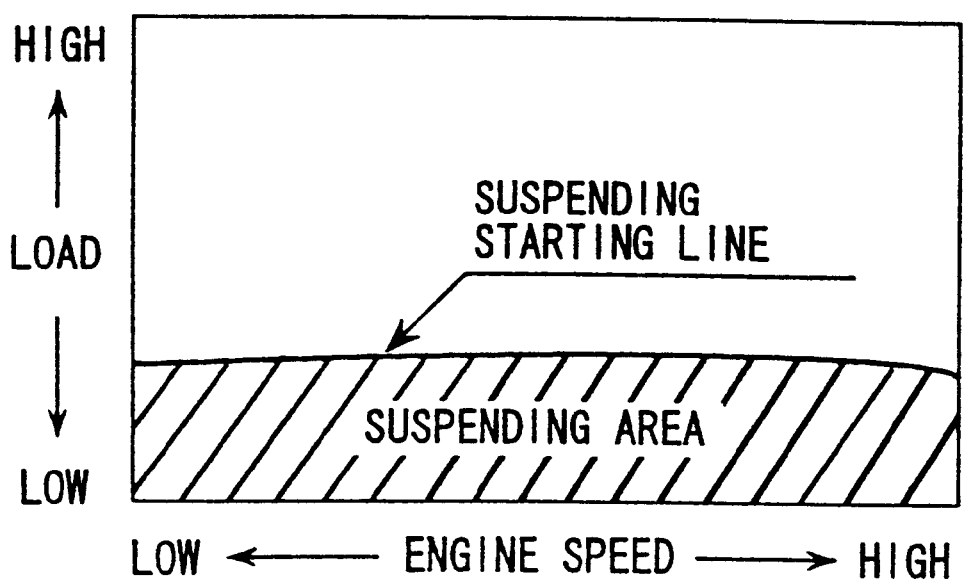
FIG. 4 is a diagram showing a suspending control area according to a first embodiment of the present invention.

The above suspending conditions map 35 is, as shown in FIG. 4, a map parameterizing the engine load and the engine speed $N_E$, which is obtained based on experiments or the like. The suspending area is an area below a suspending line which is drawn slightly higher than an area obtained from actual experiments.

In the injection/ignition determining section 36, based on signals derived from the suspending control judging section 34, it is determined whether the subject cycle is a combustion cycle or is a suspending cycle and that signal is outputted to the fuel injection amount determining section 37, the corrected fuel injection determining section 38 and the corrected ignition timing determining section 39. When it is determined that the subject cycle is a combustion cycle, fuel injection and spark ignition are performed respectively once per one engine revolution. Further, when it is determined that the subject cycle is a suspending cycle, the frequency of the suspending cycle is determined so as to increase as the engine load becomes low and to decrease as the engine load becomes high.

Further, in the fuel injection amount determining section 37, a fuel injection amount GF is determined by referring to a table parameterizing the reference delivery ratio $L_0$ and the engine speed $N_E$. Further, a fuel pressure coefficient $K_s$ and a dead fuel injection time $T_s$ are determined by referring to a table parameterizing a fuel pressure $P_s$ of the fuel pressure in the high pressure line of the fuel system. The abovementioned tables have been prepared by experiments or through designing beforehand with respect to corresponding parameters. The fuel pressure coefficient $K_s$ is a fuel injection characteristic of the fuel injector 6, which varies according to the fuel pressure $P_s$ and the dead fuel injection time $T_s$, and is for compensating a delay time of operation of the fuel injector 6, which varies according to the fuel pressure $P_s$.

The fuel injection duration time $T_i$ is calculated in accordance with the formula $T_i = K_s \times GF + T_s$ and outputted to the corrected fuel injection timing determining section 38 and the fuel injection timing determining section 40. When a signal for suspending combustions is inputted from the injection/ignition determining section 36, the duration time $T_i$ is set to 0 (zero) and this value is outputted to the corrected injection timing determining section 38 and the fuel injection timing determining section 40.

In the corrected fuel injection timing determining section 38, the corrected fuel injection timing is determined by way of making a correction of the fuel injection timing (expressed in a crank angle) obtained from a table parameterizing the reference delivery ratio $L_0$ and the engine speed $N_E$ by using the necessary correction value (retard or advance expressed in a crank angle) and is outputted to the ignition timing determining section 40. Further, when a signal for suspending combustions is inputted to the corrected fuel injection timing determining section 38 from the injection/ignition determining section 36, the determination of fuel injection timing is not performed.

Further, in the fuel injection timing determining section 40, the fuel injection timing inputted from the corrected fuel injection timing determining section 38 is converted into the fuel injection timing with respect to a reference crank angle detected by the crank position detecting section 32 and a signal corresponding to the fuel injection amount which is obtained from the fuel injection amount determining section 37 is outputted to the fuel injector 6 through the driver section 42.

Thus, a fuel injection means is constituted by the fuel injection amount determining section 37, the corrected fuel injection timing determining section 38, the fuel injection timing determining section 40, the driver section 42 and the fuel injector 6, as described above.

Further, in the corrected ignition timing determining section 39, a corrected ignition timing $IG_t$ is determined by means of making a correction by employing a correction value parameterizing the reference delivery ratio $L_0$ and the engine speed $N_E$ or by means of making other necessary corrections and is outputted to the ignition timing determining section 41. When a signal for suspending combustions in cylinders is inputted from the injection/ignition determining section 36 to this corrected ignition timing determining section 39, the determination of ignition timing is stopped.

Further, in the ignition timing determining section 41, the ignition timing outputted from the corrected ignition timing determining section 39 is converted into an ignition timing with respect to a reference position of the crank shaft detected in the crank position detecting section 32 and a signal of that ignition timing is outputted to the igniter 9 through the driver section 43.

Thus, an igniting means is constituted by the corrected ignition timing determining section 39, the ignition timing determining section 41, the driver section 43 and the igniter 9.

Figure 3:
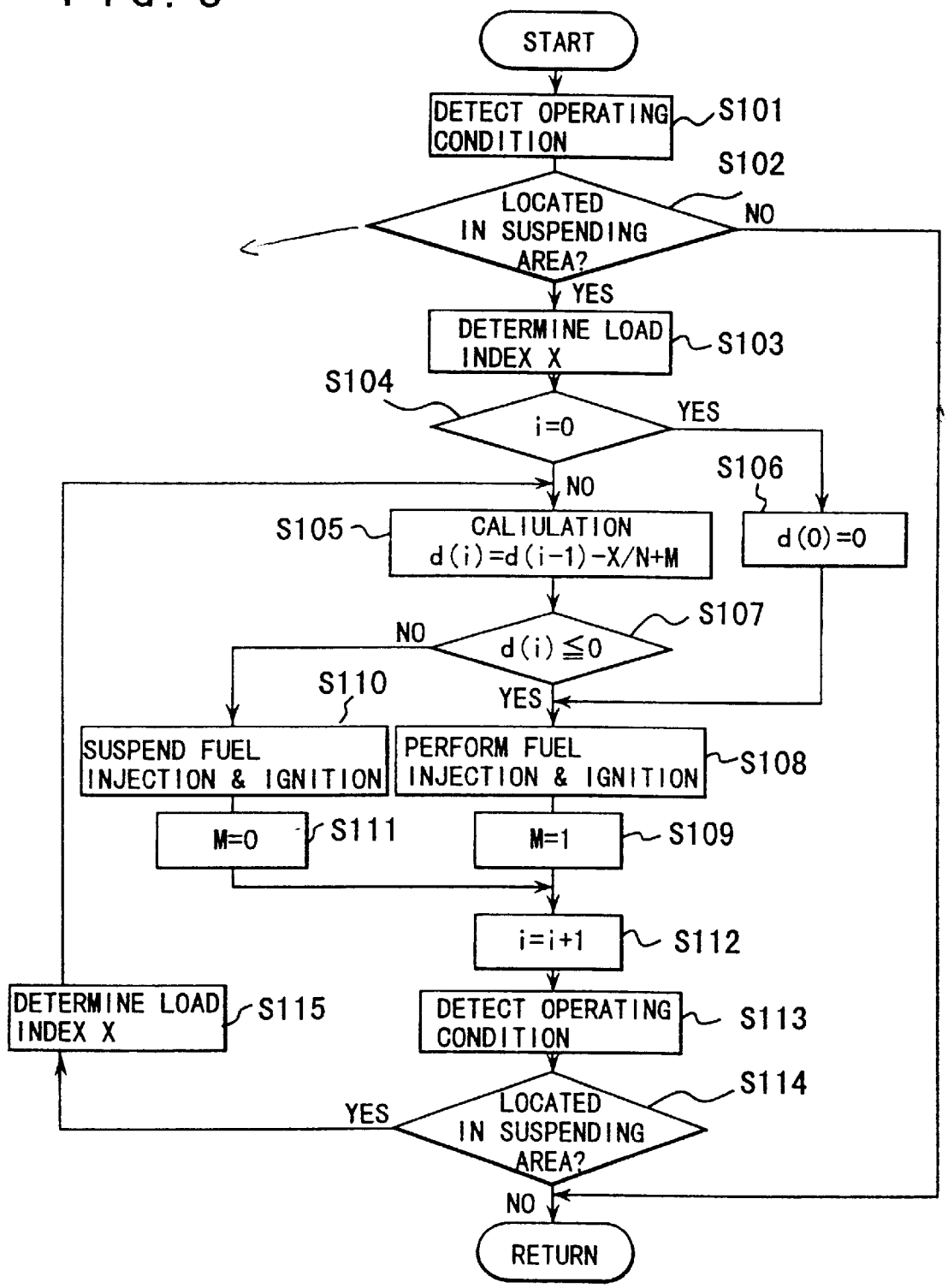
FIG. 3 is a flowchart showing a suspending control according to a first embodiment of the present invention.

Next, referring to a flowchart of FIG. 3, the suspending control of the ECU 20 will be described.

First, at a step 101 (hereinafter, referred to as S number) the operating condition of the engine, i.e., the engine speed $N_E$ detected by the engine speed calculating section 31 and the engine load detected by the operating condition detecting section 33, is detected and at S102 the suspending conditions map 35 is used to look up and parameterize the engine speed $N_E$ and the engine load. Then, if the value parameterizing the engine speed $N_E$ and the engine load is located above the suspending line, since the value does not belong to a misfiring area, the normal cycle control (one injection and one ignition per one engine revolution) is performed and then the program goes out of the routine. On the other hand, if the value parameterizing the engine speed $N_E$ and the engine load is located below the suspending line, since the value belongs to a misfiring area, the program goes to S103 from which the suspending control of fuel injection and spark ignition is started.

At S103, a load index X (a degree of the engine load) at the engine speed $N_E$ is calculated. The load index is defined as a value indicative of a degree of a current engine load relative to an upper limit engine load represented by the load index N (integer). Here, for example, X=1 denotes an engine load at idling and X=N denotes an engine load at the upper limit of the suspending region for each engine speed.

Then, the program goes to S104 where it is judged whether or not the cycle number i is 0 in order to confirm whether the present cycle is an initial cycle for performing the suspending control, or not. If it is an initial one (i=0), the program steps to S106 where an operator d(i=0) is let to be 0 (zero) and skips to S108. On the other hand, if the cycle number i is not 0 (i=1, 2, 3, . . . ), the program steps to S105 where the operator d(i) is obtained from the following formula:

$$d(i) = d(i-1) - X/N + M \qquad (1)$$

where d(i) is an operator at the present cycle, d(i−1) is an operator at the previous cycle, and M is an indicator for indicating the execution of injection/ignition (M=1 denotes that an injection/ignition has been executed and M=0 denotes that no injection/ignition has not been executed).

After the operator d(i) is obtained from the formula (1), the program goes to S107 where it is judged whether or not d(i) is equal to or smaller than 0. If d(i)≦0, the program goes to S108 and if d(i)>0, it goes to S110. When the program goes to S108 from S106 or S107, a signal is outputted from the injection/ignition determining section 36 to the injection amount determining section 37 and the corrected injection timing determining section 38 so as to inject fuel at the present cycle ("i"th cycle), and a signal is outputted to the corrected ignition timing determining section 39 so as to ignite spark at the present cycle ("i"th cycle). Then, the program goes to S109 in which the indicator M is set to 1.

On the other hand, when the program goes from S107 to S110, at S110 a signal is outputted from the injection/ignition determining section 36 to the injection amount determining section 37 and the corrected injection timing determining section 38 so as to suspend fuel injection at the present cycle ("i"th cycle) and at the same time a signal is outputted to the corrected ignition timing determining section 39 so as to suspend ignition at the present cycle ("i"th cycle). After that, the program goes to S111 where M is set to 0 (zero). When the program goes to S112 after setting M at S109 or S111, the cycle number i is counted up and this new number i is used for the next suspending control of fuel injection and spark ignition. At S113, the operating conditions (engine speed $N_E$ and engine load) are detected, and at S114, if it is judged that the value parameterizing the engine speed $N_E$ and the engine load is above the suspending line, the program goes out of the routine. If it is judged that that value is below the suspending line, the program goes to S115 where the new load index X is determined and then the program returns to S105. Thus, the routine is repeated in the same manner. When the program goes out of the routine from the S102 or S114, the cycle number i is cleared to 0.

Next, several examples of calculation of the suspending cycle will be shown with reference to FIG. 5a, FIG. 5b and FIG. 5c.

Where N is 500 and X is 255, in an example shown in FIG. 5a, since the indicator M is 1 because the system is in the first cycle, the formula (1) is:

$$d(1)=d(0)-255/500+1=0-255/500+1=245/500>0$$

Accordingly, the program goes to S110 where the suspending of fuel injection and spark ignition is executed and at S111 M is set to 0. Further, at the next cycle i=2

$$d(2)=d(1)-255/500+0=245/500-255/500=-10/500\leq 0$$

As a result, the program goes to S108 where fuel injection and spark ignition are executed, and at S109 M is set to 1. At the subsequent cycles, the third cycle, the fourth cycle . . . , the calculations will be executed in the same manner. In this case, the suspending of fuel injection and spark ignition is performed alternately.

On the other hand, referring to an example shown in FIG. 5b, where N is 500 and X is 400 (the load is located on the higher side within the suspending area), the suspending of fuel injection and spark ignition occurs every five cycles.

Further, referring to an example shown in FIG. 5c, where N is 500 and X is 100 (the load is located on the lower side within the suspending area), the fuel injection and spark ignition occurs every five cycles.

That is to say, according to the formula (1), when the value parameterizing the engine speed and the engine load is located in the suspending area, the frequency of the suspending of combustion is controlled so as to be lower as the target engine load is higher.

Thus, according to the first embodiment of the two-cycle direct injection engine, misfires can be prevented by suspending combustions at the frequency corresponding to the engine load. That is to say, when the engine load is at the area where misfire tends to occur, the scavenging is performed securedly at cycles without combustion and the combustion is performed securedly at cycles with combustion, whereby excessive hydrocarbons emissions and poor fuel economy are prevented. Furthermore, since the frequency of suspending combustions is determined properly according to the degree of the engine load, the combustion control can be easily and smoothly accomplished.

Next, a second embodiment according to the present invention will be described with reference to FIG. 6, FIG. 7, FIG. 8, FIG. 9 and FIG. 10. In this embodiment, the engine is a multi-cylinder engine wherein the suspending control is independent for a specific cylinder.

Figure 6:
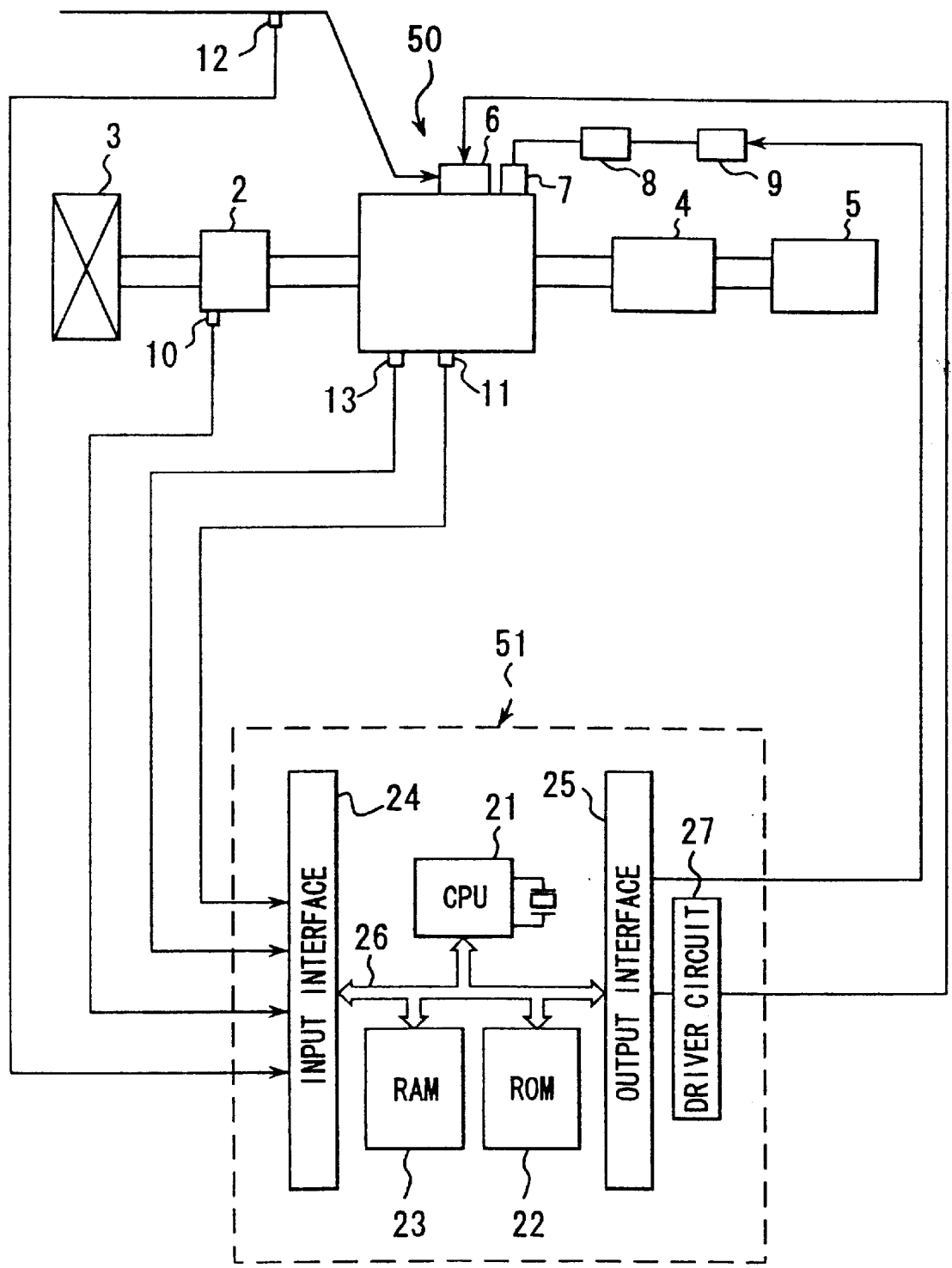
FIG. 6 is a schematic diagram showing an engine control system according to a second embodiment of the present invention.

Referring to FIG. 6, numeral 50 is a two-cycle spark ignition multi-cylinder direct injection engine and in this embodiment the engine is a three cylinder engine. In the engine 50, in addition to the components of the engine 1 according to the first embodiment, a cylinder discrimination sensor 13 is provided with the engine 50. The cylinder discrimination sensor 13 is for discriminating the cylinder number subjected to fuel injection and ignition and it is connected with the input interface 24 of the ECU 51.

The object of the second embodiment is to prevent such a situation that a specific cylinder is always subjected to the suspending of combustion and another cylinder is always subjected to combustion. In the cycle control of this engine, when the target load (the present position of the throttle opening angle) is located at the area where misfires tend to occur, the suspending control is performed separately for each cylinder. That is to say, for example, when in the #1 cylinder it is judged that the target load is at the suspending area, the suspending control is performed according to the signals of fuel injection and ignition for #1 cylinder based on a signal of the cylinder discrimination sensor 13, and then in the #3 cylinder the suspending control is performed according to the signals of fuel injection and ignition for #3 cylinder. The frequency of suspending is determined independently for each cylinder according to the degree of the engine load in the same manner as in the first embodiment.

Figure 7:
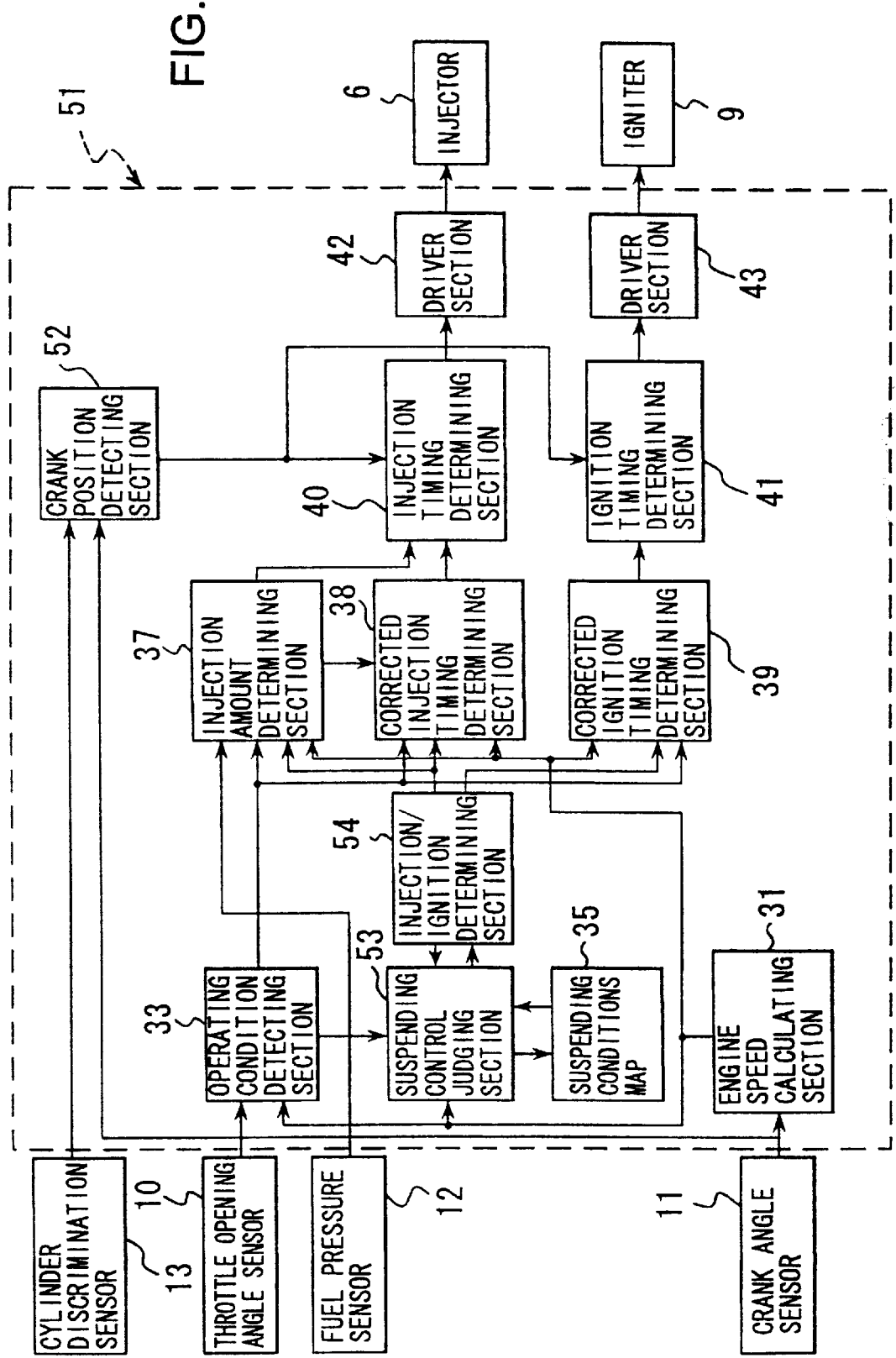
FIG. 7 is a functional block diagram of an electronic control unit according to a second embodiment of the present invention.

In order to realize the above cycle control, the ECU 51 mainly comprises, as shown in FIG. 7, an engine speed calculating section 31, a crank position detecting section 52, an operating condition detecting section 33, a suspending control judging section 53, a suspending conditions map 35, an injection/ignition determining section 54, an injection amount determining section 37, a corrected injection timing determining section 38, a corrected ignition timing determining section 39, an injection timing determining section 40, an ignition timing determining section 41, and driver sections 42, 43.

The crank position detecting section 52 detects a crank angle for each cylinder based on a signal derived from the crank angle sensor 11 and a signal derived from the cylinder discriminating sensor 13. Thus, a cylinder discriminating means is constituted by the crank angle sensor 11 and the cylinder discriminating sensor 13.

Further, the suspending control judging section 53 judges whether or not the engine load detected by the operating condition detecting section 33, namely the target engine load required through the throttle valve is located in the suspending area by referring to the suspending condition map 35 parameterizing the engine speed $N_E$ calculated by the engine speed calculating section 31 and the engine load detected by the operating condition detecting section 33.

If the target engine load is not located in the suspending area, since there is no possibility of misfiring, each cylinder is controlled independently so as to perform one injection and one ignition per one engine revolution. On the other hand, when the target engine load is in the suspending area, the frequency of suspending fuel injection and ignition is determined according to the predetermined formula so as to reduce the frequency of suspending fuel injection and spark ignition as the target load becomes high and this determination signal is outputted to the injection/ignition determining section 54.

Next, in the injection/ignition determining section 54, based on that determination signal, it is determined independently for each #1, #2 and #3 cylinder that the present cycle is subjected to either a suspending cycle or a combustion cycle and the determination signal is outputted to the injection amount determining section 37, the corrected injection timing determining section 37, and the corrected ignition timing determining section 39.

Next, the suspending control according to the second embodiment will be described with reference to the flowcharts shown in FIG. 8 and FIG. 9.

Figure 8:
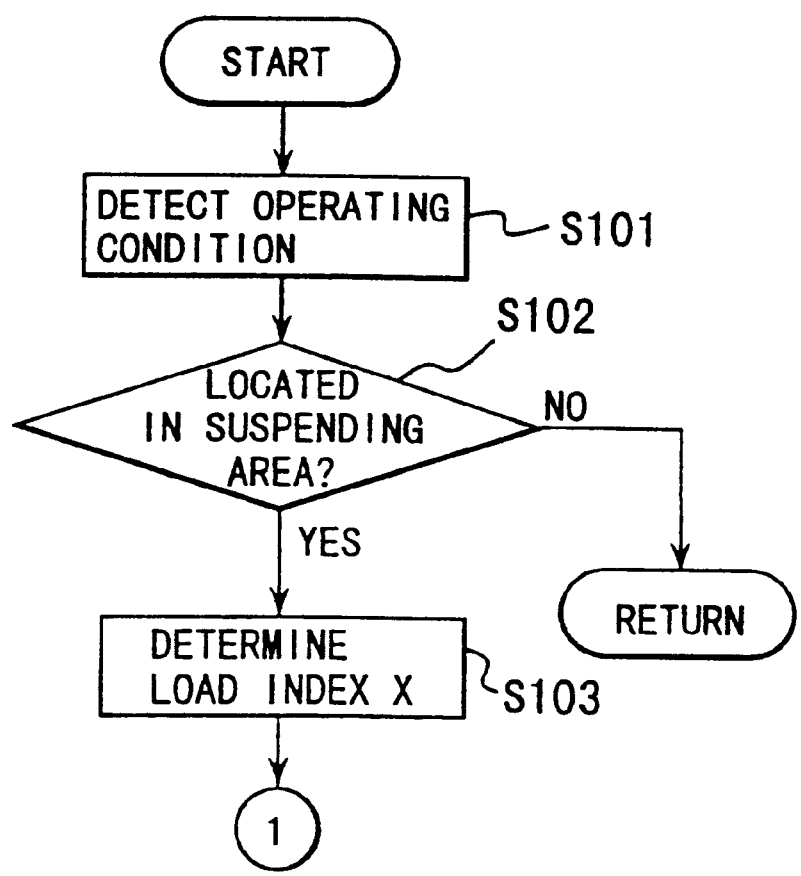
FIG. 8 is a flowchart showing a suspending control according to a second embodiment of the present invention.
Figure 9:
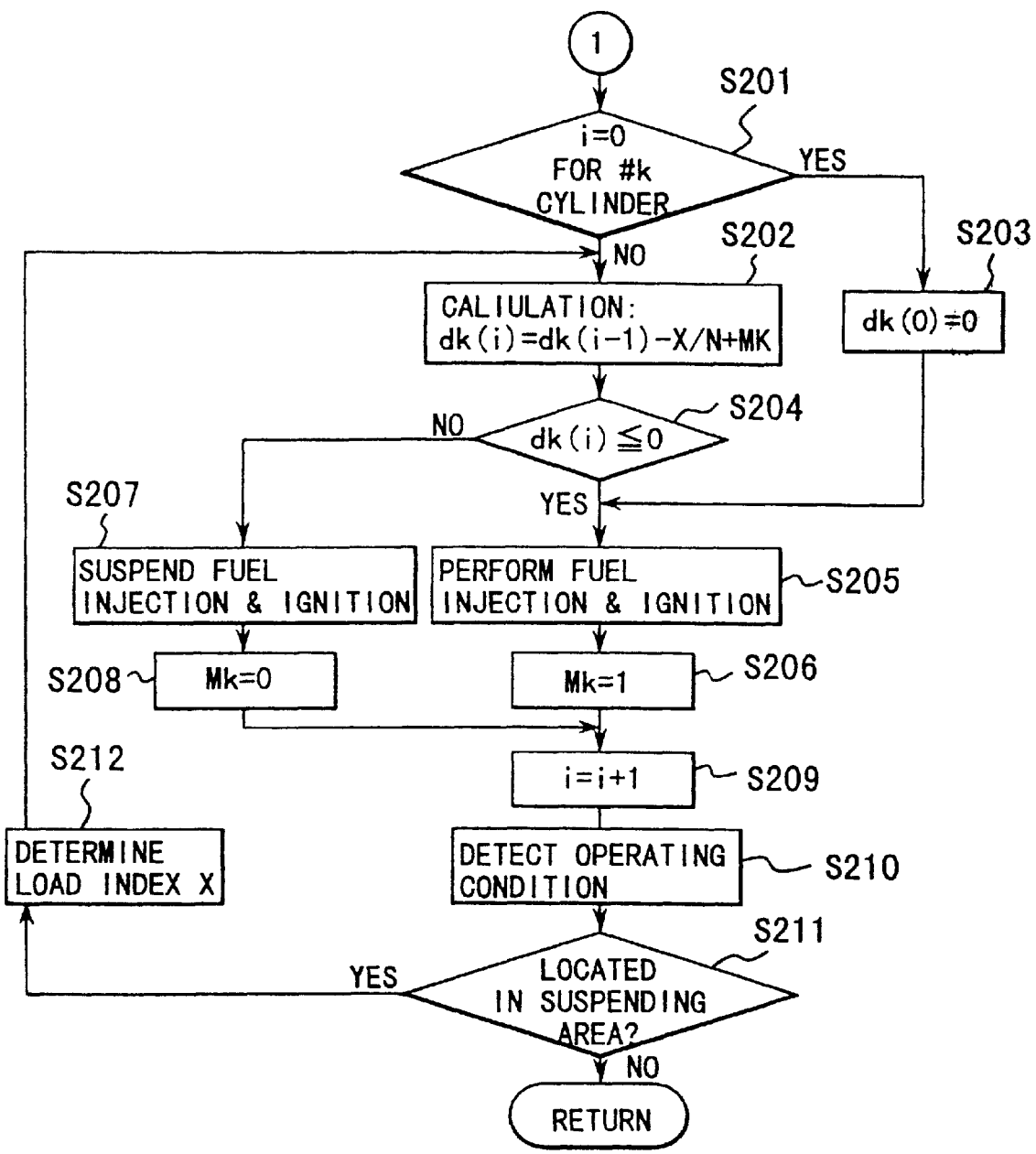
FIG. 9 is a flowchart continued from FIG. 8.

Referring now to FIG. 8, as described in the first embodiment, at S101 the engine speed $N_E$ and the engine load are detected. At S102, when it is judged that the value parameterizing the engine speed $N_E$ and the engine load is below the suspending line and there is a possibility of misfiring at low load cycles, the program goes to S103 where the load index X of the engine load is determined and then the program steps to S201. The steps after S201 are those which are executed per each cylinder independently.

At S201, it is judged whether or not the present cycle is a first one (cycle number i=0) for the #k cylinder (k=1, 2 and 3). If it is the first one, the program steps to S203 where an operator $d_k(0)$ for the #k cylinder is set to 0 and the program skips to S205. On the other hand, if the cycle number i is equal to or larger than 1 (i=1, 2, 3, . . . ), the program goes to S202 where the operator $d_k(i)$ for the #k cylinder at the cycle number i is obtained from the following formula:

$$d_k(i) = d_k(i-1) - X/N + M_k \qquad (2)$$

where $d_k(i-1)$ is an operator for the #k cylinder at the previous i−1 cycle; $M_k$ is an indicator for the #k cylinder which has been determined at the previous cycle.

After the operator $d_k(i)$ for the #k cylinder is obtained from the above formula (2), the program goes to S204 where it is judged whether or not the obtained operator $d_k(i)$ is equal to 0 or smaller than 0 ($d_k(i) \leq 0$). If $d_k(i) \leq 0$, the program goes to S205 and if $d_k(i) > 0$, the program takes a step to S207.

When the program steps from S204 or S204 to S205, a signal is outputted from the injection/ignition determining section 54 to the corrected injection amount determining section 37 and the corrected ignition timing determining section 38 so as to inject fuel into the #k cylinder and at the same time a signal is outputted from the injection/ignition determining section 54 to the corrected ignition timing determining section 39 so as to apply a spark ignition to the #k cylinder. After that, at S206 the indicator $M_k$ is set to 1.

On the other hand, when the program goes from S204 to S207, in which a signal is outputted from the injection/ignition determining section 54 so as to suspend a fuel injection and at the same time a signal is outputted from the injection/ignition determining section 54 to the corrected ignition timing determining section 39 so as to suspend a spark ignition to the #k cylinder. Then, the program goes to S208 where the indicator $M_k$ is set to 0.

After setting the indicator $M_k$ at S206 or S208, the program steps to S209 where the cycle number i of the #k cylinder is counted up and then at S210 the operating conditions (engine speed $N_E$ and engine load) are detected. Then, at S211 it is judged whether or not the value parameterizing the engine speed $N_E$ and the engine load is located in the area where misfires tend to occur by referring to the suspending conditions map 35 parameterizing the engine speed $N_E$ and the engine load. If it is judged that the value is not in the area where misfires tend to occur, the program goes out of the routine because this cycle is a normal combustion cycle. On the other hand, if it is judged that the value is in the area where misfires tend to occur, the program steps to S212 in which the load index X of the target engine load is graded in the resolution N at the engine speed $N_E$ and then returns to S202 from which the same routine is repeated. When the program goes out of the routine, the cycle number i of the #k cylinder is cleared to 0.

Figure 10:
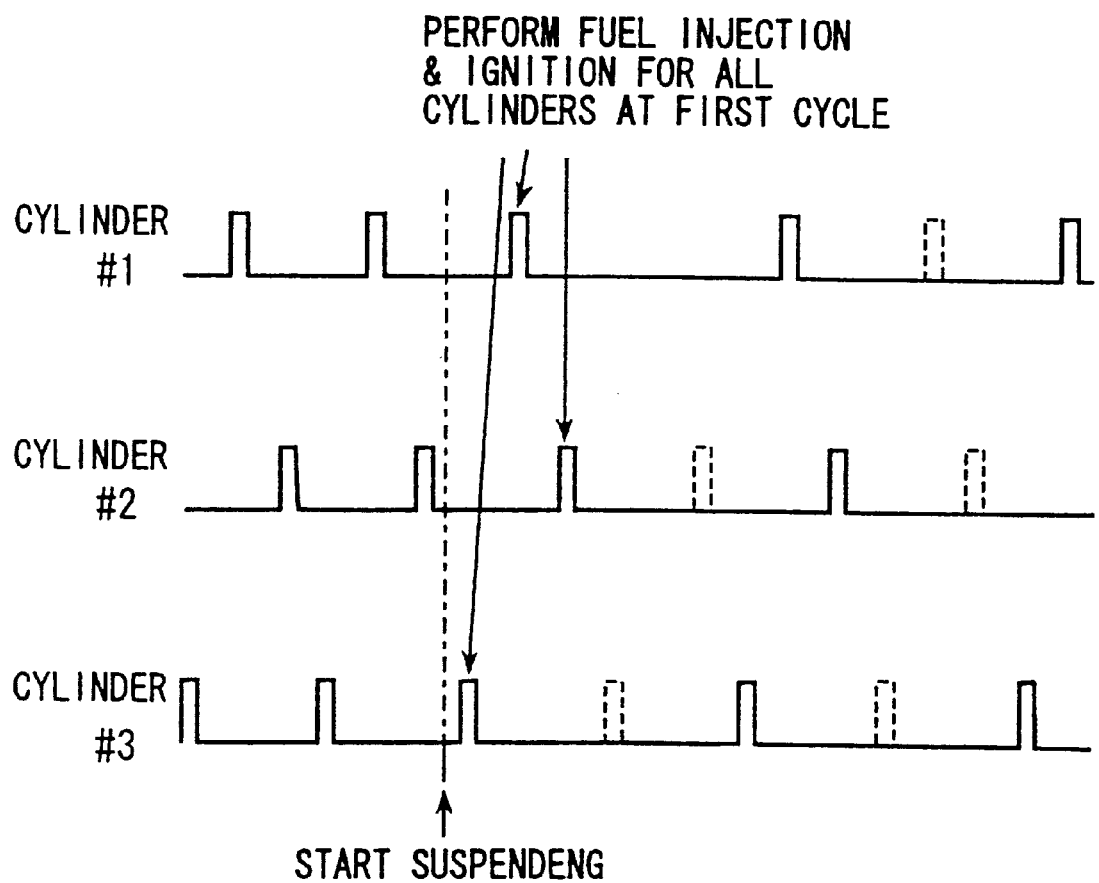
FIG. 10 is a timing chart showing an example of a suspending control according to a second embodiment of the present invention.

FIG. 10 shows an example of a time chart of the aforementioned suspending control. In this example, for the #1 cylinder a combustion and a suspending of fuel injection and ignition and an execution of fuel injection and ignition are executed interchangeably according to the aforementioned flowchart. Also, in the #2 and #3 cylinders, the suspending control is performed respectively in the similar way.

According to the second embodiment, the same effect as described in the first embodiment can be obtained for each #1, #2 and #3 cylinder. Additionally, according to the second embodiment, since the suspending control is made independently for each cylinder, the impartiality of combustions among cylinders can be prevented. That is to say, in the case where the first embodiment is applied to a three cylinder two cycle engine, for example, when a suspending of combustion is attempted to be executed every three cycles, a specific cylinder is all the time subjected to suspendings of combustion and other two cylinders are all the time subjected to combustions. This impartiality of combustions causes abnormal vibrations and noises during the operation of the engine.

FIG. 11, FIG. 12, FIG. 13 and FIG. 14 show a third embodiment according to the present invention. According to the third embodiment, when it is judged that the target load is located in the suspending area, the fuel injection amount and the ignition timing are corrected in accordance with the number of suspending. Since the constitution of the engine control system of the third embodiment is roughly the same as that of the second embodiment, the same numerals are attached to the same sections as described in the second embodiment.

Figure 11:
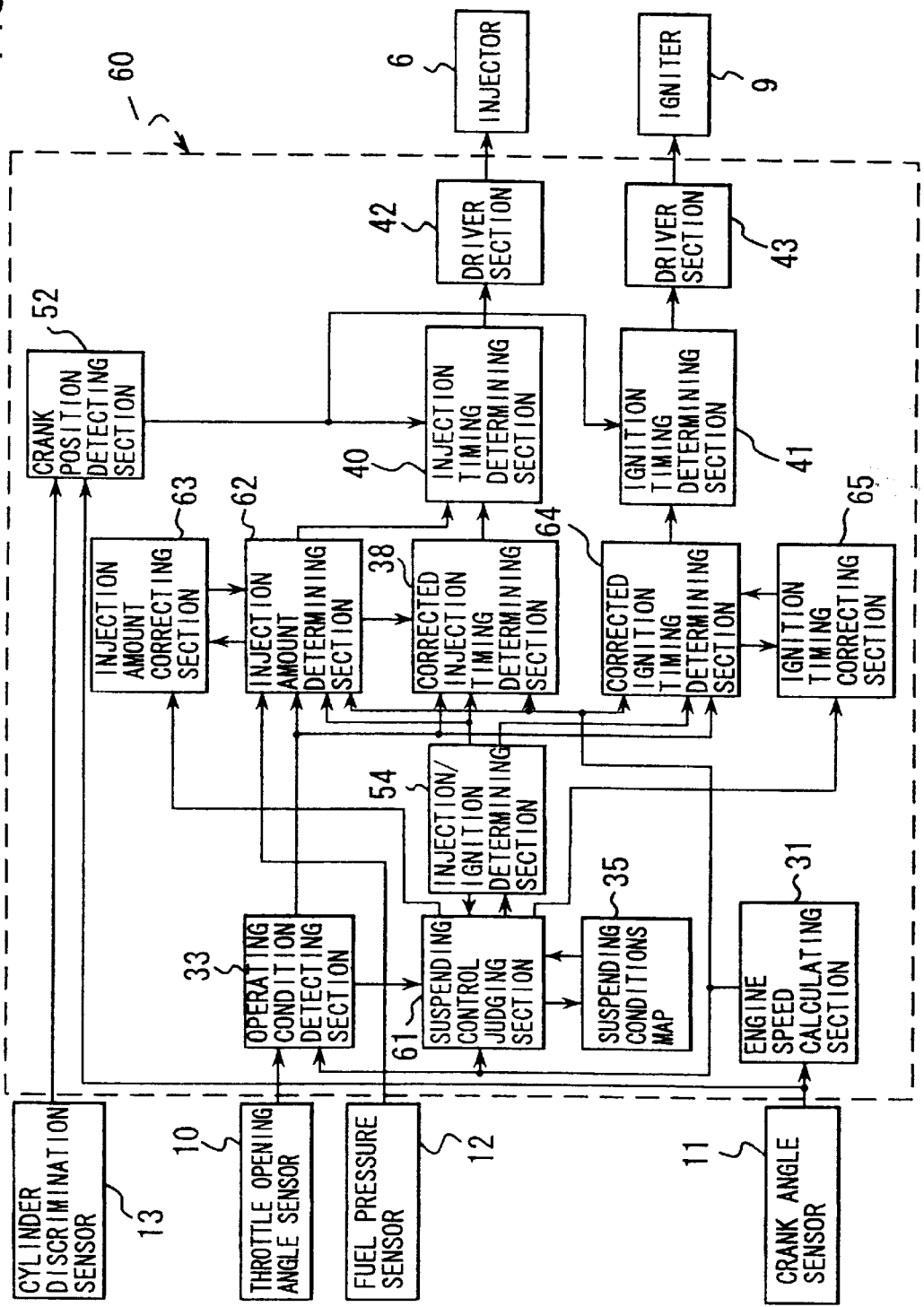
FIG. 11 is a functional block diagram of an electronic control unit according to a third embodiment of the present invention.

Referring now to FIG. 11, numeral 60 denotes an ECU in which, when the target load is located in the area where misfires tend to occur, the frequency of suspending combustions is determined by use of a formula independently for each #1, #2 and #3 cylinder based on the engine speed and the engine load so as to reduce that frequency as the engine load becomes high. After the thus determined frequency is converted into a signal, the signal is outputted to the fuel injection and ignition systems to suspend fuel injection and spark ignition for that cycle. On the other hand, the number of suspending has been counted independently for each cylinder and in the next combustion cycle the fuel injection amount and the ignition timing are corrected in accordance with that number of the previous suspendings. The corrected fuel injection amount and the corrected ignition timing are converted into signals respectively and those signals operate the fuel injection and ignition systems so as to drive the injector 6 and the igniter 9.

To realize the above cycle control, the ECU 60 mainly comprises an engine speed circulating section 31, a crank position detecting section 52, an operating condition detecting section 33, a suspending control judging section 61, a suspending conditions map 35, an injection/ignition determining section 54, an injection amount determining section 62, an injection amount correcting section 63, a corrected fuel injection timing determining section 38, a corrected ignition timing determining section 64, an ignition timing correcting section 65, an injection timing determining section 40, an ignition timing determining section 41 and driver sections 42, 43.

The suspending control judging section 61 judges whether or not the engine load detected by the operating condition detecting section 33, namely the target engine load required through the throttle valve, is located at the suspending area by referring to the suspending condition map 35 parameterizing the engine speed $N_E$ calculated by the engine speed calculating section 31 and the engine load detected by the operating condition detecting section 33.

If the target engine load is not loaded in the suspending area, since there is no possibility of misfiring, each cylinder is controlled independently so as to execute one injection and one ignition per one engine revolution. On the other hand, when the target engine load is in the suspending area, the frequency of suspending fuel injection and ignition is determined according to the predetermined formula so as to reduce the frequency of suspending fuel injection and spark ignition as the target load becomes high and this determination signal is outputted to the injection/ignition determining section 54. Further, in the suspending control judging section 61, based on a signal derived from the injection/ignition determining section 54, the number of suspending is counted independently for each cylinder and is outputted to the injection amount correction section 63 and the ignition timing correcting section 65.

In the injection amount determining section 62, the fuel injection amount GF is determined for each cylinder by referring to the table parameterizing the reference delivery ratio $L_0$ detected by the operating condition detecting section 33 and the engine speed $N_E$ from the engine speed calculating section 31 and further the fuel pressure coefficient $K_s$ and the dead fuel injection time $T_s$ are determined by referring to the table parameterizing the fuel pressure $P_s$ detected by the fuel pressure sensor 12. Further, the final fuel injection amount is converted into the fuel injection duration time $T_i$. The fuel injection duration time $T_i$ is calculated in accordance with the formula $T_i = K_s \times GF + T_s$ and outputted to the corrected fuel injection timing determining section 38 and the fuel injection timing determining section 40.

Further, when the signal for suspending combustion is inputted from the injection/ignition determining section 54 to the fuel injection amount determining section 62, the fuel injection duration time $T_i$ is set to 0 and this value is outputted to the corrected injection timing determining section 38 and the injection timing determining section 40.

On the other hand, when a signal for instructing injection during the suspending control is inputted from the injection/ignition determining section 54 to the injection amount determining section 62, $T_i$ is set to the fuel injection amount at the minimum load on the suspending line and an increment correction coefficient $K_{MS}$ for increasing the fuel injection amount at the suspending control is read from the injection amount correcting section 63. The final fuel injection amount is obtained by correcting the above $T_i$ by this increment correction coefficient $K_{MS}$ ($T_i+K_{MS}$) and this value is outputted to the corrected injection timing determining section 38 and the injection timing determining section 40. The fuel injection amount at the minimum load on the suspending line has been stored beforehand as the data parameterizing the engine speed $N_E$.

Figure 13:
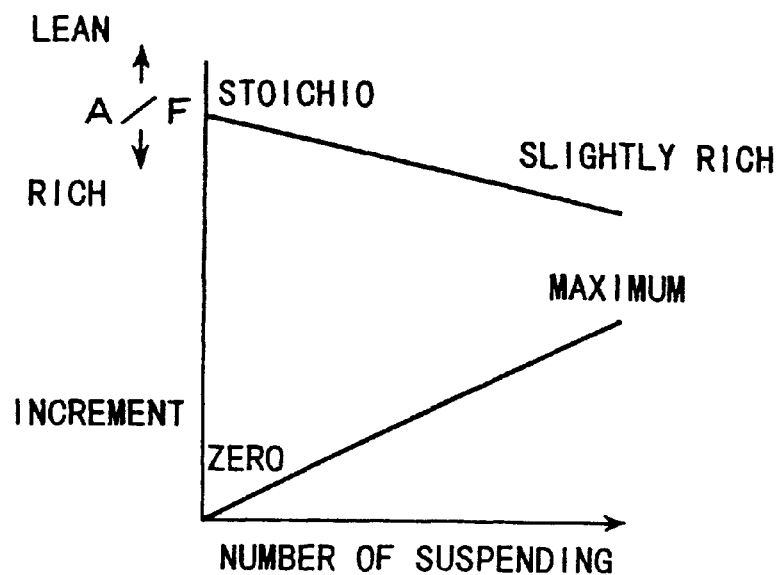
FIG. 13 is a schematic diagram showing a relationship between the number of suspending and an injection amount according to a third embodiment of the present invention.

In the injection amount correcting section 63, the increment correction coefficient $K_{MS}$ is stored on a map parameterizing the number of suspendings which is inputted from the suspending control judging section 61 and is read by the injection amount determining section 62. The map is prepared beforehand through experiments and the like. The increment correction coefficient $K_{MS}$ has a characteristic rising with an increase of the number of suspendings as shown in FIG. 13 so as to shift the air-fuel (A/F) slightly to the rich side-as the number of suspending increases.

Thus, the injection amount determining section 62, the injection amount correcting section 63, the corrected injection timing determining section 38, the injection timing determining section 40, the driver section 42 and the injection 6 constitute a fuel injection means according to the third embodiment.

Further, in the corrected ignition timing determining section 64, the corrected ignition timing $IG_t$ is determined by making a correction using the correction coefficient parameterizing the reference delivery ratio $L_0$ and the engine speed $N_E$ and is outputted to the ignition timing determining section 41.

When a signal for suspending ignition is inputted from the injection/ignition determining section 54 to the above corrected ignition timing determining section 64, the determination of ignition timing is not performed. On the other hand, a signal for instructing ignition during the suspending control is inputted form the injection/ignition determining section 54 to the corrected ignition timing determining section 64, $IG_t$ is set to the ignition timing at the minimum load on the suspending line and an ignition timing correction coefficient $K_{Mt}$ for correcting the ignition timing at the suspending control is read from the injection timing correcting section 65. The final injection timing is obtained by correcting the above ignition timing $IG_t$ by this correction coefficient $K_{Mt}$ ($IG_t+K_{Mt}$) and this value is outputted to the ignition timing determining section 41. The ignition timing at the minimum load on the suspending line has been stored beforehand as the data parameterizing the engine speed $N_E$.

Figure 14:
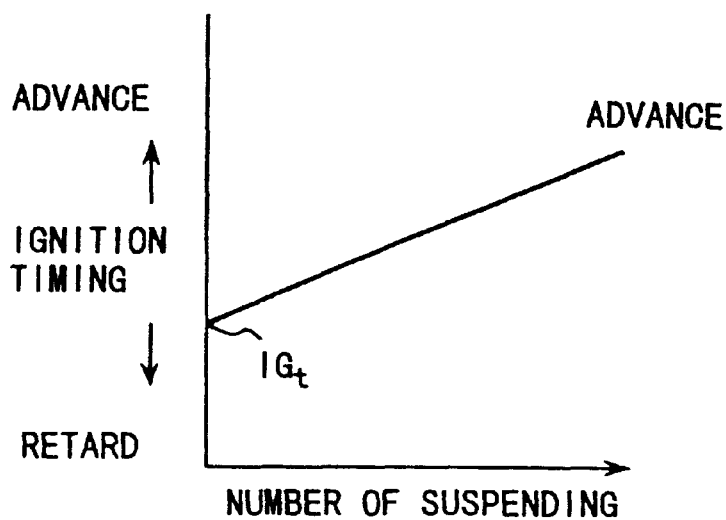
FIG. 14 is a schematic diagram showing a relationship between a number of suspending and an ignition timing according to a third embodiment of the present invention.

In the ignition timing correcting section 65, the ignition timing correction coefficient $K_{Mt}$ as shown in FIG. 14 is determined with respect to the number of suspendings which is inputted from the suspending control judging section 61 beforehand by experiments and other means and this correction coefficient is read by the corrected ignition timing determining section 64.

Figure 12:
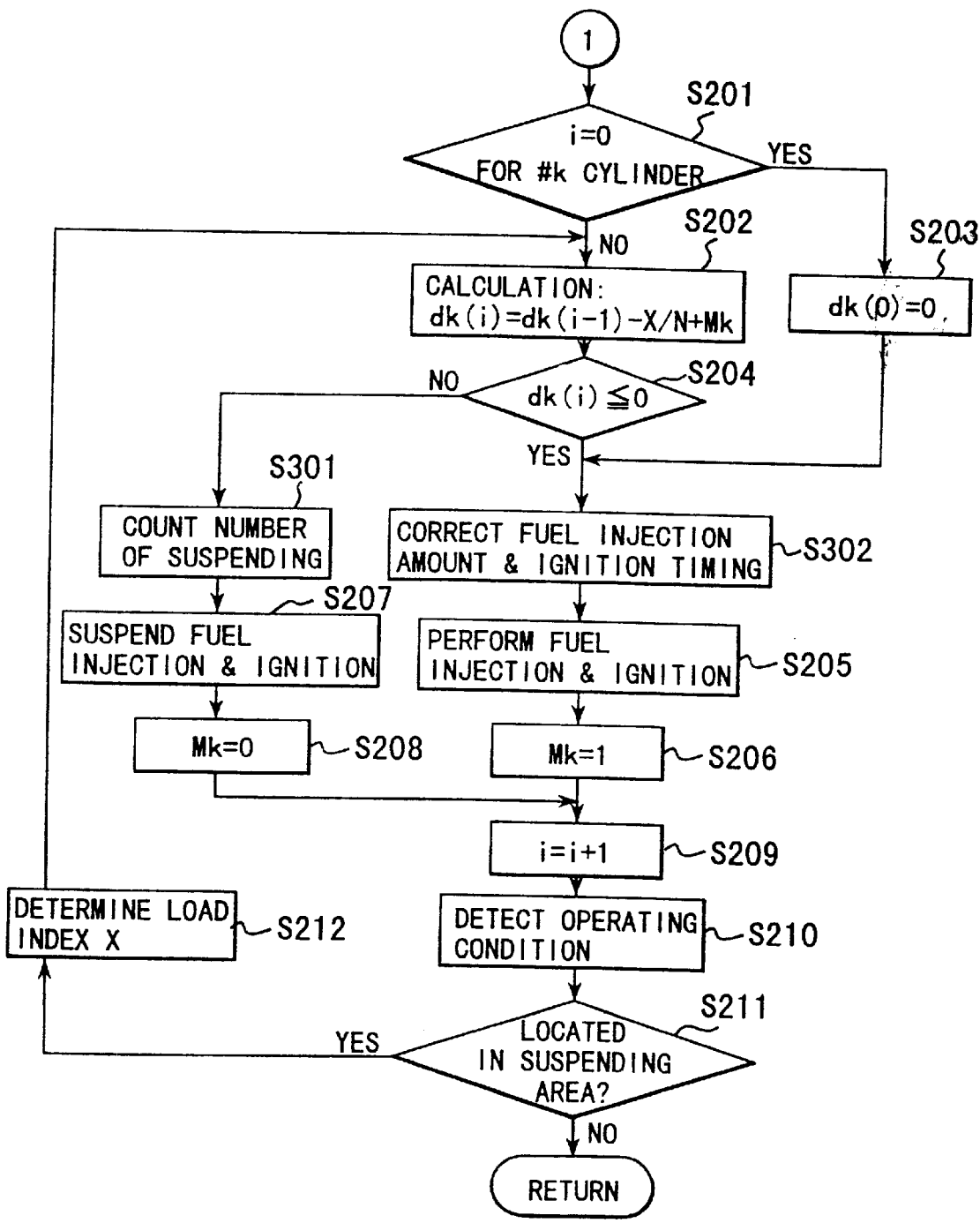
FIG. 12 is a flowchart showing a suspending control according to a third embodiment of the present invention.

Next, the suspending control of fuel injection and spark ignition which is executed by the ECU 60 will be described according to a flowchart shown in FIG. 12.

After determining the load index X at S103, at S201 if it is judged that the cycle is an initial cycle (i=0) of the suspending control for the cylinder (#k cylinder: k=1, 2 and 3), the program goes to S203 where the operator dk(0) for the initial cycle is set to 0 and then the program skips to S302.

On the other hand, at S201 if it is judged that the cycle is not an initial cycle (i≠0), the program goes to S202 where the operator $d_k(i)$ for the "i"th cycle of the #k cylinder is calculated and steps to S204. At S204, if $d_k(i) \leq 0$, the program goes to S302 and if $d_k(i) > 0$ goes to S301.

If the program goes from S203 or S204 to S302, in the injection amount determining section 62 and the injection amount correcting section 63, the fuel injection amount $T_i$ at the start of the suspending is corrected by the increment correction coefficient $K_{MS}$ and at the same time, in the corrected ignition timing determining 64 and the ignition timing correcting section 65, the ignition timing $IG_t$ at the start of the suspending is corrected by the ignition timing correction coefficient $K_{Mt}$. After that, the program goes to S205 in which a signal for injecting fuel at that cycle ("i"th cycle of the #k cylinder) is outputted from the injection/ignition determining section 54 to the injection amount determining section 62 and the corrected injection timing determining section 38 and at the same time a signal for instructing ignition at that cycle ("i"th cycle of the #k cylinder) is outputted to the corrected ignition timing determining section 64. Then, at S206 the indicator $M_k$ of the #k cylinder is set to 1.

On the other hand, if the program steps from S204 to S301, the number of suspending is counted therein and then at S207 a signal for suspending injection in that cycle ("i"th cycle of the #k cylinder) is outputted from the injection/ignition determining section 54 to the injection amount determining section 62 and the corrected injection timing determining section 38 and at the same time a signal for suspending ignition also in that cycle ("i"th cycle of the #k cylinder) is outputted to the corrected ignition timing determining section 64. Then, at S208 the indicator $M_k$ of the #k cylinder is set to 0. The number of suspending is cleared out when the program gets out of the routine.

After the setting of $M_k$ is finished at S206 or S208, the program sets to S209 where the cycle number i of the #k cylinder is counted up. Hereinafter, steps are taken in the same manner as described in the second embodiment.

Thus, according to the third embodiment, when the suspending control is applied, since cycles without combustion or cycles with scavenging only are inserted intermittantly, the combustion chamber is rather cooled, which contributes to poor combustion. To compensate this phenomenon, the air-fuel ratio is shifted slightly to the rich side (a slight increase of fuel injection amount) and the ignition timing is also slightly advanced. That is to say, the feature of the third embodiment is to keep combustion in a good condition as well as to ensure the same effect as described in the second embodiment.

It is needless to say that the aspect of this third embodiment can be applied to the first embodiment. Further, concerning the way of correcting the fuel injection amount and the ignition timing, in the third embodiment, the preferred way of correcting both has been described, however other ways of correcting either fuel injection or ignition may be allowed.

Figure 15:
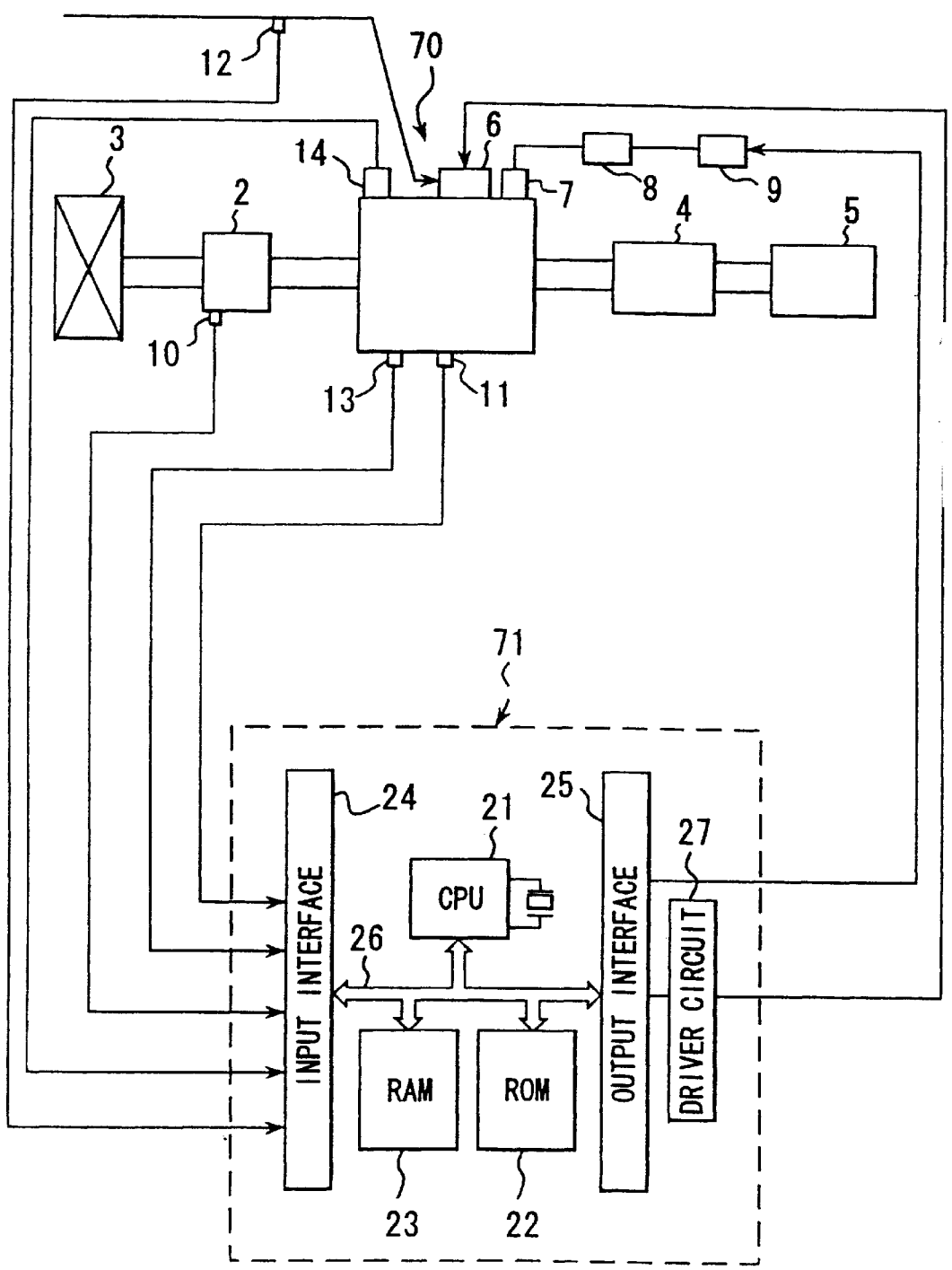
FIG. 15 is a schematic diagram showing an engine control according to a fourth embodiment of the present invention.
Figure 16:
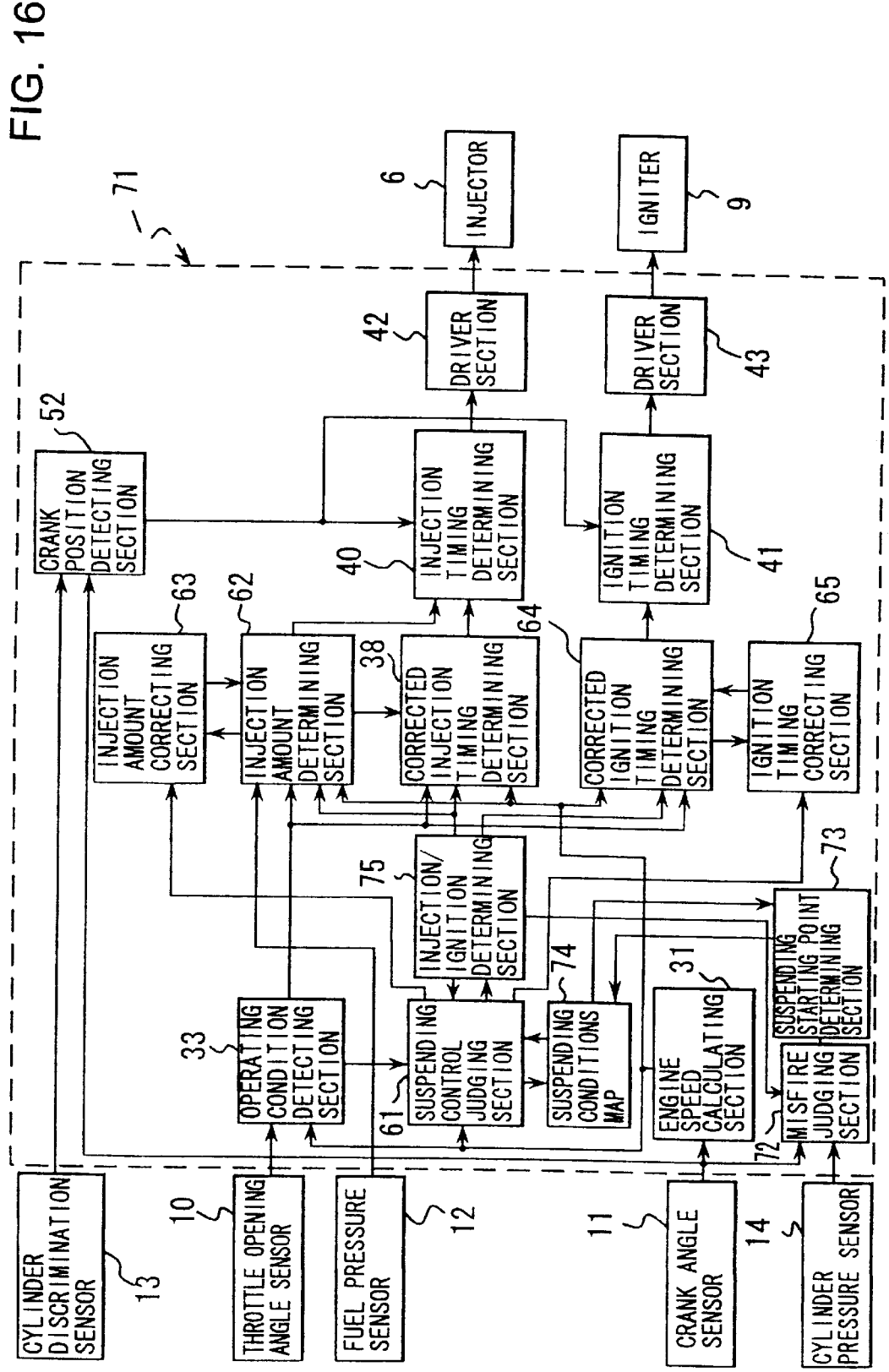
FIG. 16 is a functional block diagram of an electronic control unit according to a fourth embodiment of the present invention.
Figure 17:
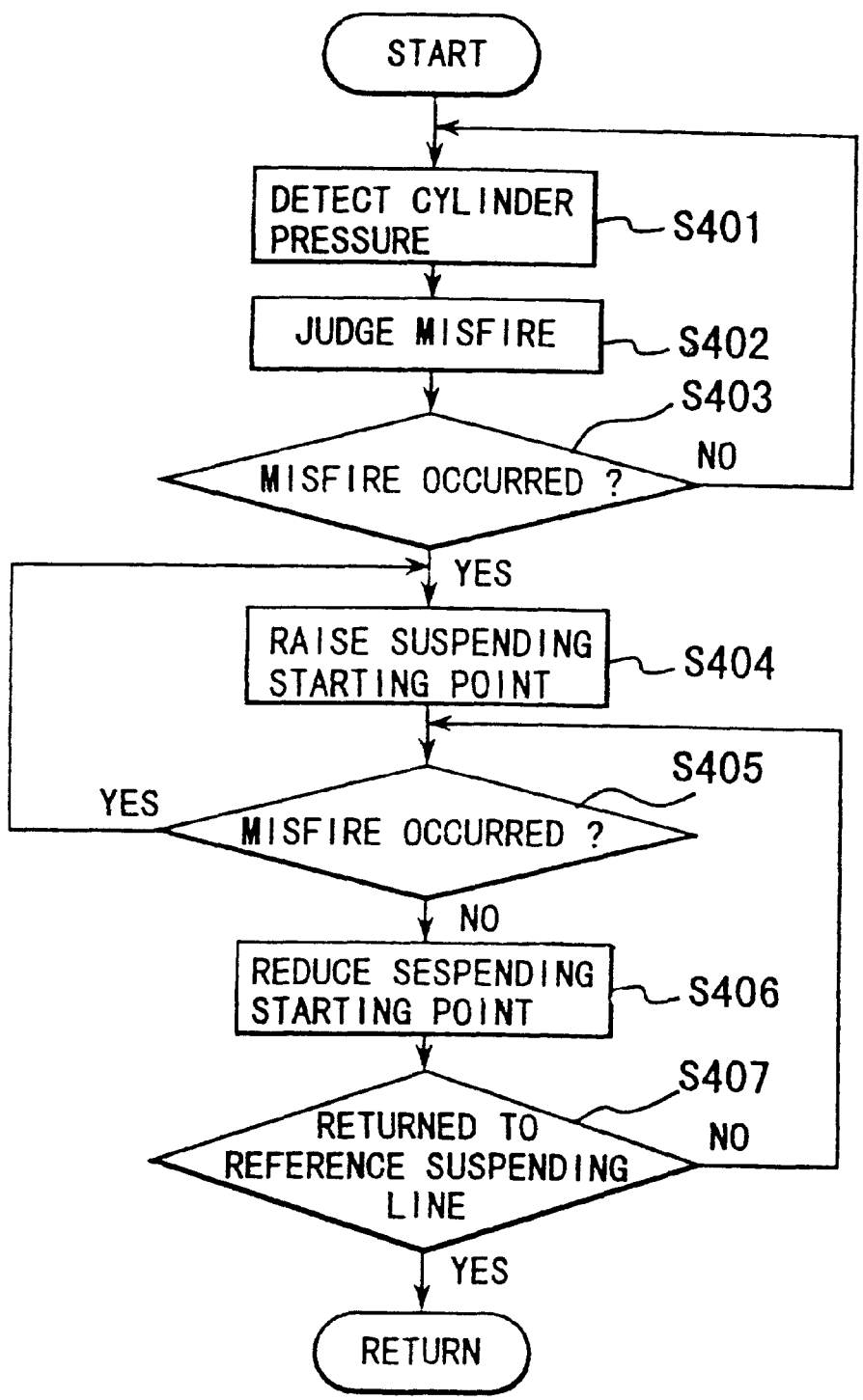
FIG. 17 is a flowchart for determining a starting point of suspending combustions according to a fourth embodiment of the present invention.

FIG. 15, FIG. 16 and FIG. 17 indicates a fourth embodiment according to the present invention. The feature of the fourth embodiment is to detect the presence of misfire and to make the suspending conditions map variable based on the detection of misfire.

Referring to FIG. 15, numeral 70 denotes a three cylinder two cycle in-cylinder engine in which a cylinder pressure sensor 14 for detecting the pressure in the cylinder is disposed in the combustion chamber in addition to the compositions of the third embodiment. The cylinder pressure sensor 14 is connected with the input interface 24 of the ECU 71.

In the cycle control of the ECU 71, it is judged whether or not a misfire occurs based on signals derived from the crank angle sensor 11 and from the cylinder pressure sensor 14. If a misfire occurs, the predetermined area where misfires tend to occur is expanded by a certain degree to the higher side of the engine load. If the target engine load is located in that area, the frequency of suspendings is determined independently for each #1, #2 and #3 cylinder such that the frequency of suspendings is reduced as the engine load becomes higher and a signal is outputted to the fuel injection and ignition systems so as to suspend combustions based on the frequency. Further, the number of suspendings is counted for each cylinder and in the combustion cycle the fuel injection amount and the ignition timing are corrected according to this number of suspendings. Further, signals of the corrected injection amount and the corrected ignition timing are outputted to the fuel injection and ignition systems to drive the fuel injector 6 and the ignitor 9 respectively.

In order to realize the above cycle control, the ECU 71 mainly comprises an engine speed calculating section 31, a crank position detecting section 52, a misfire judging section 72, a suspending starting point determining section 73, an operating condition detecting section 33, a suspending control judging section 61, a suspending condition map 74, an injection/ignition determining section 75, an injection amount determining section 62, an injection amount correcting section 63, a corrected injection timing determining section 38, a corrected ignition timing determining section 64, an ignition timing correcting section 65, an injection timing determining section 40, an ignition timing determining section 41 and the driver sections 42, 43.

The misfire judging section 72 is for detecting an existence of non-existence of misfire based on the crank angle signal from the crank angle sensor 11 and the signal from the cylinder pressure sensor 14. Namely, a misfire is detected using the phenomenon that when a misfire occurs, the cylinder pressure becomes lower than that at the normal combustion. The detection of misfire is done during the suspending control as well as during the normal cycle control (the control of not suspending fuel injection and ignition).

The above suspending conditions map 74 is a map parameterizing the engine speed $N_E$ and the engine load and it is prepared beforehand by experiments and the like. The reference suspending line is established at the position slightly higher (to the higher load side) than the position where misfire starts to occur. The area lower than the reference suspending line is an area where the suspending control is to be applied.

Further, in the suspending starting point determining section 73, when a misfire signal is inputted from the misfire judging section 72, the above reference suspending line of the suspending conditions map 74 is shifted by a predetermined value to the high load side so as to expand the area where the suspending control is to be performed in the high load direction. On the other hand, when there is no misfire signal from the above misfire judging section 72, the present suspending line of the suspending conditions map 74 is moved step by step by a predetermined value toward the low load side (a lower limit is the reference suspending line) so as to return the area where the suspending control is to be performed in the low load direction.

In the injection/ignition determining section 75, it is determined based on a signal from the suspending control judging section 61 whether the present cycle is a combustion cycle or a suspending cycle independently for each #1, #2 and #3 cylinder and that determination signal is outputted to the injection amount determining section 62, the corrected injection timing determining section 38 and the corrected ignition timing determining section 64. Further, the above signal of suspending combustions is inputted to the misfire judging section 72 to discriminate between misfires and suspendings (artificial misfires).

Next, the determination of the suspending line (suspending starting point) will be described with reference to a flowchart in FIG. 17.

When the program starts, at S401 the cylinder pressure of the object cylinder is detected based on a signal derived from the cylinder pressure sensor 14 and then at S402 it is judged whether or not the detected cylinder pressure is a pressure indicating a misfire by a crank angle signal derived from the crank angle sensor 11 and by a signal showing that the present cycle is a combustion cycle.

If it is judged that the cylinder pressure is a pressure indicating a misfire, namely that a misfire has occurred, the program goes to S404 and if it is judged that no misfire has occurred, the program returns to S401. When the program goes to S404 as a result of judging that a misfire has occurred, the suspending lien (suspending starting point) of the suspending conditions map 74 is raised by a predetermined value toward the high load side and then at S405 it is judged whether or not a misfire has occurred again in a following predetermined few cycles.

If a misfire has occurred in the predetermined few cycles, the program returns to S404 further to raise the suspending starting point. On the other hand, if a misfire has not occurred in the predetermined few cycles, the program steps to S406 where the suspending starting point is reduced by a predetermined value toward the low load side.

Further, at S407 it is judged whether or not the suspending starting point thus reduced has returned to the reference suspending line. If not, the program returns to S405 and if yes, the program gets out of the routine.

The cycle control is processed based on the suspending conditions map 74 which has been obtained as described above.

According to the fourth embodiment, the suspending starting point of the suspending conditions map is determined in an optimum style with respect to an individual engine regardless of production variations of the engine, aged deteriorations of a specific engine and the like, and as a result an optimum suspending control can be accomplished for any engine.

The fourth embodiment is a variation of the third embodiment, however it is needless to say that the aspect of the fourth embodiment can be applied also to the first and second embodiments.

Next, FIG. 18, FIG. 19, FIG. 20 and FIG. 21 show an example of a fifth embodiment according to the present invention. The fifth embodiment is a variation of the third embodiment which is constituted such that the fuel properties are detected, and based on that fuel property, the suspending conditions map is made variable.

Figure 18:
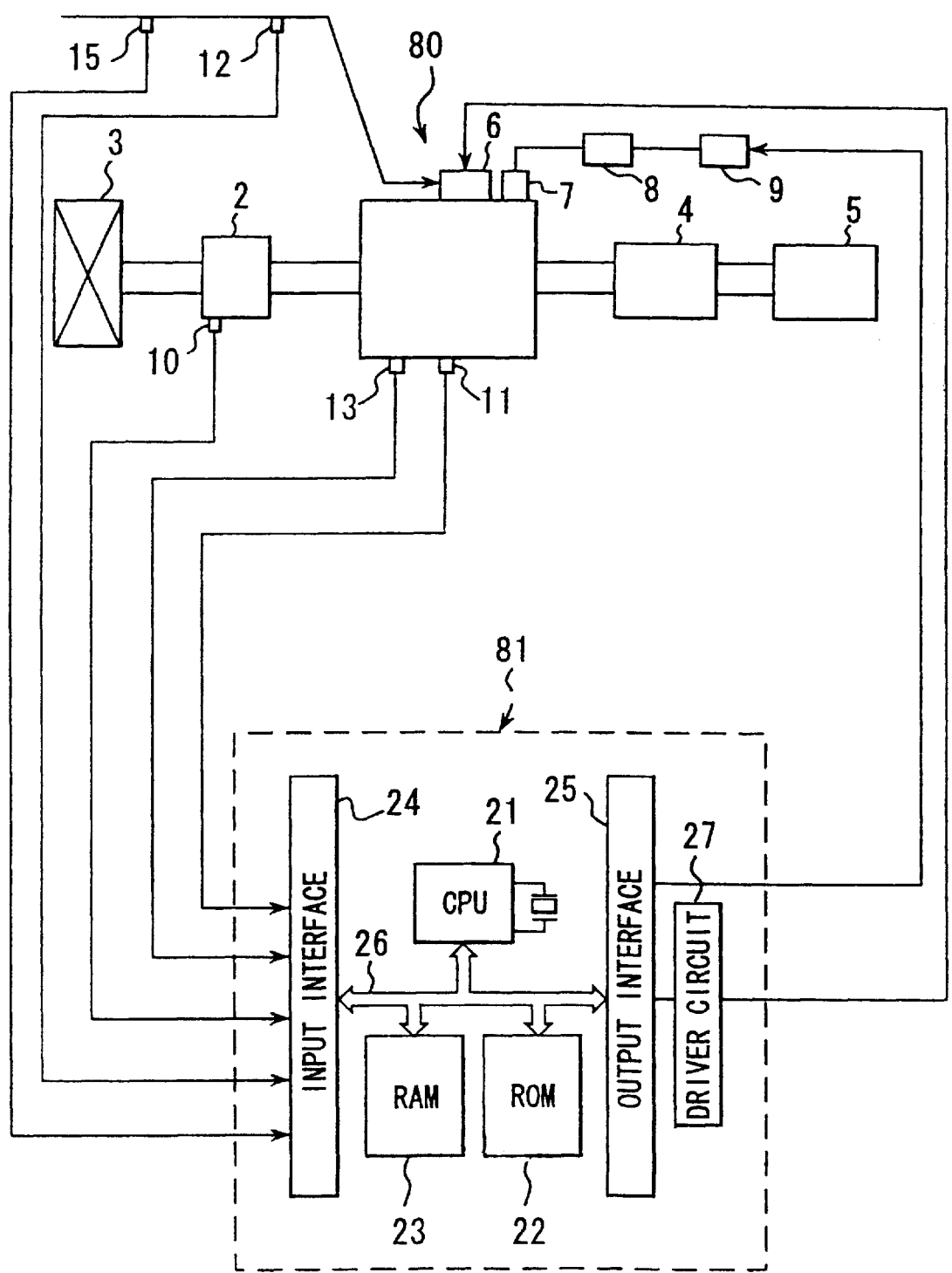
FIG. 18 is a schematic diagram showing an engine control system according to a fifth embodiment of the present invention.

Referring now to FIG. 18, numeral 80 denotes a three cylinder two-cycle in-cylinder injection engine in which in addition to the engine components described in the third embodiment a fuel properties sensor (a sensor for detecting fuel properties, in this embodiment, a degree of fuel gravity) 15 is disposed in the fuel delivery line of the engine 80. The fuel properties sensor 15 is connected with the input interface 24 of the ECU 81.

In the cycle control by the ECU 81, the area where misfires tend to occur has been determined based on the standard fuel properties and that area has been established on a map which will be described hereinafter. The area is varied according the fuel properties detected by the fuel properties sensor 15. When the target engine load is located in the area of this map, the frequency of suspending compositions is determined independently for each #1, #2 and #3 cylinder based on the engine speed and the engine load so as to reduce that frequency as the engine load becomes high. After the thus determined frequency is converted into a signal, the signal is outputted to the fuel injection and ignition systems to suspend fuel injection and spark ignition for that cycle. On the other hand, the number of suspending has been counted independently for each cylinder and in the next combustion cycle the fuel injection amount and the ignition timing are corrected in accordance with that number of the previous suspendings. The corrected fuel injection amount and the corrected ignition timing are converted into signals respectively and those signals operate the fuel injection and ignition systems so as to drive the injector 6 and the ignitor 9.

Figure 19:
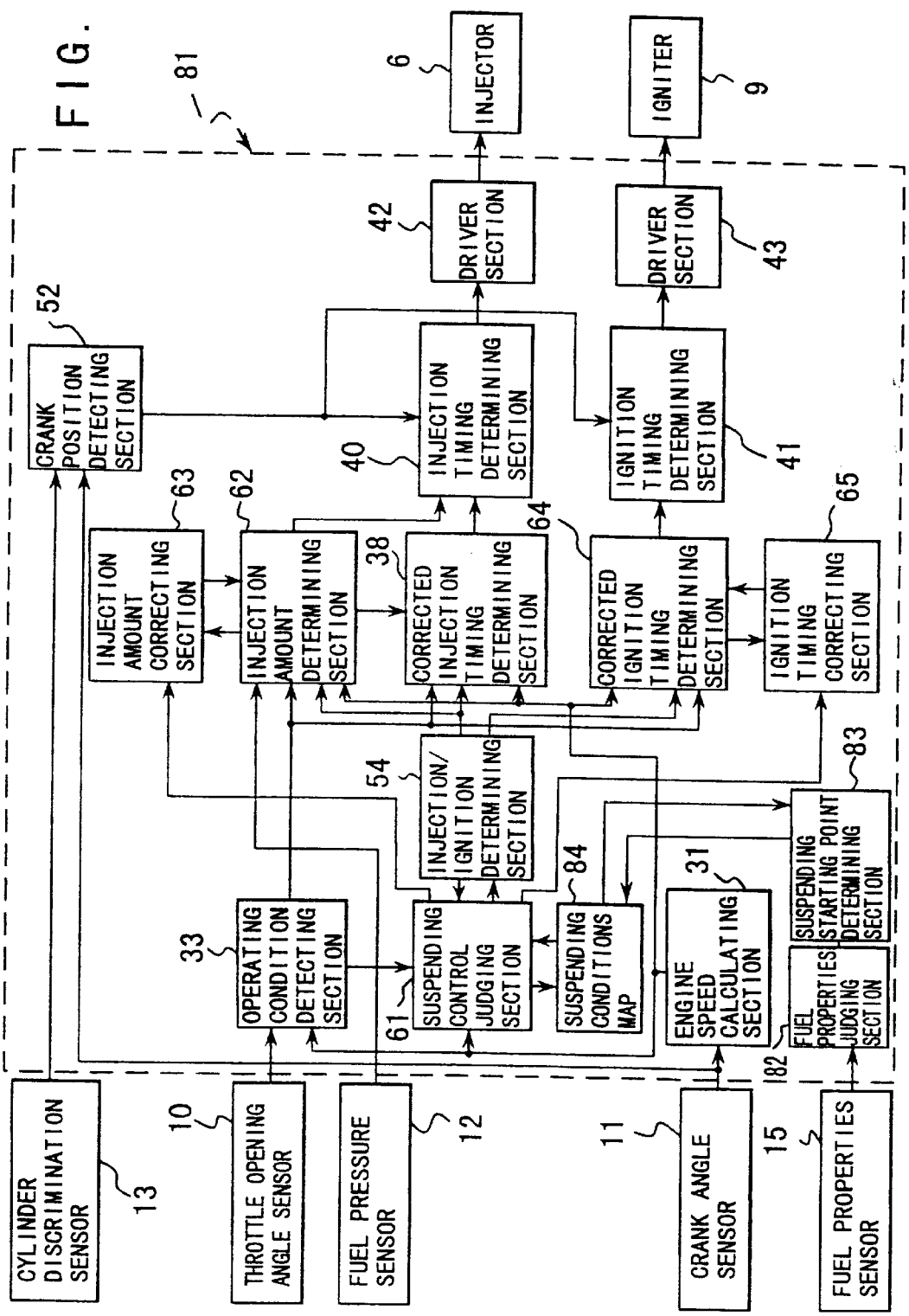
FIG. 19 is a functional block diagram of an electronic control unit according to a fifth embodiment of the present invention.

In order to realize the above cycle control as depicted in FIG. 19, the ECU 81 mainly comprises an engine speed calculating section 31, a crank position detecting section 52, a fuel properties judging section 82, a suspending starting point determining section 83, an operating condition detecting section 33, a suspending control judging section 61, a suspending conditions map 84, an injection/ignition determining section 54, an injection amount determining section 62, an injection amount correcting section 63, a corrected fuel injection timing determining section 38, a corrected ignition timing determining section 64, an ignition timing correcting section 65, an injection timing determining section 40, an ignition timing determining section 41 and the driver sections 42, 43.

The above suspending conditions map 84 is a map parameterizing the engine speed $N_E$ and the engine load, and it has been prepared beforehand by experiments and the like. The suspending line, namely the suspending starting line which determines the starting point of suspending combustions is established when combustion is normal and the fuel has a standard fuel properties. The final suspending line on the map is set slightly at the high load side so as to vary according to the suspending starting point determining section 83. The load area below this suspending line is an area where the fuel injection and ignition are suspended.

Further, the above fuel properties judging section 82 is for finding a fuel property of the employed fuel based on a signal from the fuel properties sensor 15.

Further, based on a signal from the fuel properties judging section 82, the above suspending starting point determining section 83 detects whether or not there occurs a change in the fuel properties. If a change occurs in the fuel properties, a degree of changing the suspending starting line of the suspending conditions map 84 is obtained by retrieving a map and the suspending starting line is made to be changed. This map has been obtained beforehand by experiments and the like and it has such a characteristic shown in FIG. 21 that the suspending starting point moves toward the high load side as the fuel properties moves toward the heavy side.

Figure 20:
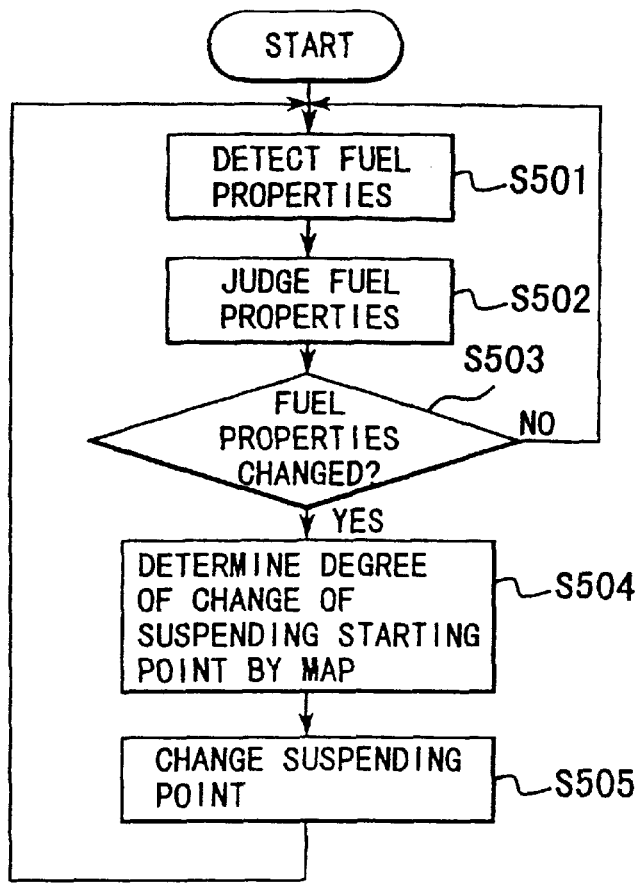
FIG. 20 is a flowchart for determining a starting point of suspending combustions according to a fifth embodiment of the present invention.

Next, the determination of the suspending starting point of the suspending conditions map 84 will be described according to the flowchart in FIG. 20.

Figure 21:
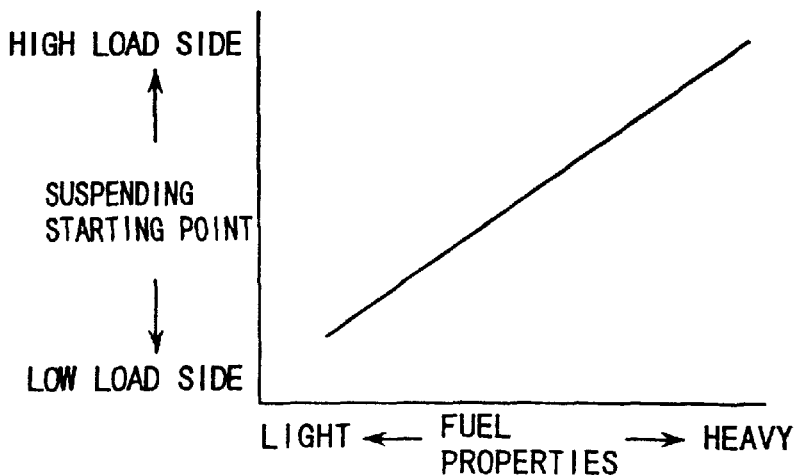
FIG. 21 is a diagram showing a relationship between the fuel properties and a starting point of suspending combustions.

When the program starts, at S501 the fuel properties are detected based on a signal from the fuel properties sensor 15 and then at S502 it is judged whether the fuel is a heavy or light fuel. Next, the program goes to S503 where it is judged whether or not there is a change in the fuel properties. If there is not, the program returns to 501 and if there is a change, the program goes to S504 where a degree of change of the suspending starting point is obtained by referring to the predetermined map as shown in FIG. 21 and then at S505 the suspending starting point of the suspending conditions map 84 is changed. Thus, the cycle control is performed based on the suspending conditions map 84 which has been thus obtained.

According to the fifth embodiment, since the suspending control is corrected according to the change of fuel properties, the stable combustion in the low load condition can be obtained regardless of the fuel properties of the employed fuel. The fifth embodiment has been described with relation to the third embodiment but the aspect thereof can be applied also to the first, second and fourth embodiments.

In summary, according to the present invention, it is possible to apply an effective combustion control to an actual two cycle in-cylinder injection engine without making large modifications. Further, the present invention provides an effective way of the combustion control for a multi-cylinder two cycle engine. Furthermore, according to the present invention, the stable combustion in the low load condition can be attained even when the engine is deteriorated or when the fuel properties are changed.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control system for a two cycle fuel injection engine having a fuel injector for injecting an amount of fuel into a cylinder of said engine, an igniter electrically connected to a spark plug via an ignition coil for igniting said fuel in said cylinder, a throttle sensor mounted on said engine for detecting an opening degree of a throttle valve and for generating a throttle signal indicative thereof, a fuel properties sensor provided on a fuel delivery line for detecting fuel properties of said fuel and for generating a fuel properties signal indicative thereof, and engine r.p.m. calculating means responsive to a crank angle signal from a crank angle sensor attached near a crankshaft of said engine for calculating an engine speed and for producing an engine speed signal indicative thereof, comprising:

target load detecting means, responsive to said throttle signal and said engine speed signal, for calculating a target load required by a driver and for producing a load signal indicative thereof;

suspending decision means, responsive to said engine speed signal and said load signal, for judging whether said target load is within a suspending region and, when said target load is within said suspending region, for generating a suspending signal indicative thereof;

suspending frequency determining means, responsive to said suspending signal, for determining a frequency of suspending fuel injection and fuel ignition in accordance with said target load in said suspending region and for generating a control signal indicative thereof; and control means responsive to said control signal for controlling said fuel injector and said igniter, p1 wherein said suspending region is varied in accordance with a change in said fuel properties signal.

2. The control system defined in claim 1, wherein said fuel properties include fuel gravity, and said suspending region is expanded to the high load side when said fuel properties signal indicates a change in said fuel properties toward a heavy side.

3. The control system defined in claim 1, wherein said suspending frequency determining means determines said frequency for each cylinder of said engine.

4. The control system defined in claim 3, wherein said fuel properties include fuel gravity, and said suspending region is expanded to the high load side when said fuel properties signal indicates a change in said fuel properties toward a heavy side.

5. A control method for a two cycle fuel injection engine having a fuel injector for injecting an amount of fuel into a cylinder of said engine, an igniter electrically connected to a spark plug via an ignition coil for igniting said fuel in said cylinder, a throttle sensor mounted on said engine for detecting an opening degree of a throttle valve and for generating a throttle signal indicative thereof, a fuel properties sensor provided on a fuel delivery line for detecting fuel properties of said fuel and for generating a fuel properties signal indicative thereof, and engine r.p.m. calculating means responsive to a crank angle signal from a crank angle sensor attached near a crank shaft of said engine for calculating an engine speed and for generating an engine speed signal indicative thereof, comprising:

calculating a target load required by a driver in response to said throttle signal and said engine speed signal;

judging whether said target load is within a suspending region;

determining a frequency of suspending fuel injection and fuel ignition in accordance with said target load when judged within said suspending region;

varying said frequency according to a change of target load which remains within said suspending region;

controlling fuel injection and fuel ignition according to said frequency; and varying said suspending region in accordance with a change in said fuel properties signal.

6. The control method defined in claim 5, wherein said fuel properties include fuel gravity, and said suspending region is expanded to the high load side when said fuel properties signal indicates a change in said fuel properties toward a heavy side.

7. The control method defined in claim 5, wherein said frequency of suspending fuel injection and fuel ignition is determined for each cylinder of said engine in accordance with said target load when judged within said suspending region.

8. The control method defined in claim 7, wherein said fuel properties include fuel gravity, and said suspending region is expanded to the high load side when said fuel properties signal indicates a change in said fuel properties toward a heavy side.

9. A control system for a two cycle fuel injection engine having a fuel injector for injecting an amount of fuel into a cylinder of said engine, an igniter electrically connected to a spark plug via an ignition coil for igniting said fuel in said cylinder, a throttle sensor mounted on said engine for detecting an opening degree of a throttle valve and for generating a throttle signal indicative thereof and engine r.p.m. calculating means responsive to a crank angle signal from a crank angle sensor attached near a crankshaft of said engine for calculating an engine speed and for producing an engine speed signal indicative thereof, comprising:

target load detecting means, responsive to said throttle signal and said engine speed signal, for calculating a target load required by a driver and for producing a load signal indicative thereof;

suspending decision means, responsive to said engine speed signal and said load signal, for judging whether said target load is within a suspending region and, when said target load is within said suspending region, for generating a suspending signal indicative thereof;

suspending frequency determing means, responsive to said suspending signal, for determing a frequency of suspending fuel injection and fuel ignition in accordance with said target load in said suspending region and for generating a control signal indicative thereof;

suspension counting means for counting a number of suspensions and for generating a count signal indicative thereof;

air fuel ratio adjusting means for determining an adjustment to an air fuel ratio in accordance with said count signal and for generating a correction signal indicative thereof; and control means responsive to said control signal and said correction signal for controlling said fuel injector and said igniter.

10. The control system defined in claim 9, wherein said air fuel ration is adjusted to be richer in accordance with an increase in said number of suspensions.

11. The control system defined in claim 9, wherein said suspending frequency determining means determines said frequency for each cylinder of said engine, and said suspension counting means independently counts said number of suspensions for each cylinder.

12. The control system defined in claim 11, wherein said air fuel ratio is adjusted to be richer in accordance with an increase in said number of suspensions.

13. A control method for a two cycle fuel injection engine having a fuel injector for injecting an amount of fuel into a cylinder of said engine, an igniter electrically connected to a spark plug via an ignition coil for igniting said fuel in said cylinder, a throttle sensor mounted on said engine for detecting an opening degree of a throttle valve and for generating a throttle signal indicative thereof and engine r.p.m. calculating means responsive to a crank angle signal from a crank angle sensor attached near a crankshaft of said engine for calculating an engine speed and for generating an engine speed signal indicative thereof, comprising:

calculating a target load required by a driver in response to said throttle signal and said engine speed signal;

judging whether said target load is within a suspending region;

determining a frequency of suspending fuel injection and fuel ignition in accordance with said target load when judged within said suspending region;

varying said frequency according to a change of target load which remains within said suspending region;

counting a number of suspension;

calculating a correction parameter for an air fuel ratio based on said number of suspensions; and controlling fuel injection and fuel ignition according to said frequency and said correction parameter.

14. The control method defined in claim 13, wherein said air fuel ration is adjusted to be richer in accordance with an increase in said number of suspensions.

15. The control method defined by claim 13, wherein said frequency of suspending fuel l injection and fuel ignition is determined for each cylinder of said engine in accordance with said target load when judged within said suspending region, and said number of suspensions is independently counted for each cylinder.

16. The control method defined in claim 15, wherein said air fuel ratio is adjusted to be richer in accordance with an increase in said number of suspension.

* * * * *